United States Patent [19]
Park et al.

[11] Patent Number: 5,718,123
[45] Date of Patent: Feb. 17, 1998

[54] REFRIGERATOR HAVING AN AIR CIRCULATION SYSTEM

[75] Inventors: Seak Haeng Park; Yong Myoung Kim, both of Kyungki-do, Rep. of Korea

[73] Assignee: Samsung Electronics Co., Ltd., Suwon, Rep. of Korea

[21] Appl. No.: 545,856

[22] PCT Filed: May 24, 1995

[86] PCT No.: PCT/KR95/00064

§ 371 Date: Nov. 13, 1995

§ 102(e) Date: Nov. 13, 1995

[87] PCT Pub. No.: WO95/33167

PCT Pub. Date: Dec. 7, 1995

[30] Foreign Application Priority Data

| Jun. 1, 1994 | [KR] | Rep. of Korea | 1994-12297 |
| Jun. 1, 1994 | [KR] | Rep. of Korea | 1994-12298 |
| Jun. 1, 1994 | [KR] | Rep. of Korea | 1994-12299 |
| Jun. 1, 1994 | [KR] | Rep. of Korea | 1994-12300 |
| Jun. 1, 1994 | [KR] | Rep. of Korea | 1994-12301 |
| Jun. 1, 1994 | [KR] | Rep. of Korea | 1994-12302 |
| Jun. 2, 1994 | [KR] | Rep. of Korea | 1994-12401 |
| Jun. 2, 1994 | [KR] | Rep. of Korea | 1994-12403 |
| Jun. 2, 1994 | [KR] | Rep. of Korea | 1994-12404 |
| Jun. 2, 1994 | [KR] | Rep. of Korea | 1994-12405 |
| Jun. 2, 1994 | [KR] | Rep. of Korea | 1994-12406 |
| Jul. 20, 1994 | [KR] | Rep. of Korea | 1994-17511 |
| Jul. 20, 1994 | [KR] | Rep. of Korea | 1994-17516 |
| Jul. 20, 1994 | [KR] | Rep. of Korea | 1994-17517 |
| Dec. 10, 1994 | [KR] | Rep. of Korea | 1994-33558 |

[51] Int. Cl.⁶ ............................................. F25D 17/06
[52] U.S. Cl. ....................................... 62/407; 62/419
[58] Field of Search ................................ 62/407, 408, 419, 62/426, 404, 418; 454/286, 305

[56] References Cited

U.S. PATENT DOCUMENTS

| 3,027,735 | 4/1962 | Preotle et al. | 62/407 |
| 3,096,629 | 7/1963 | Rembold | 62/407 |
| 4,750,416 | 6/1988 | Graham . | |
| 5,076,070 | 12/1991 | Takushima et al. | 62/426 |
| 5,315,846 | 5/1994 | Lee | 62/419 |

FOREIGN PATENT DOCUMENTS

| 39 08 847 | 9/1990 | Germany . |
| 2 206 190 | 12/1988 | United Kingdom . |

*Primary Examiner*—William Doerrler
*Attorney, Agent, or Firm*—Burns, Doane, Swecker & Mathis, L.L.P.

[57] ABSTRACT

A refrigerator includes a refrigerating compartment and a cool air distributing system on the back wall thereof. The distributing system includes vertical passages which divide a flow of incoming cool air and conduct the air to vertically spaced discharge openings communicating with the refrigerating compartment. Disposed in the path of air flow is an air directing structure having adjustable vanes for controlling the horizontal direction in which the air flows enter the refrigerating compartment. Each vane is motor driven and can comprise vertical plates or helical elements rotated about a vertical axis. Alternatively, each vane can be a helical vane disposed on the inside surface of a hollow cylinder for guiding an air flow from within the cylinder outwardly through openings formed in a wall of the cylinder.

19 Claims, 21 Drawing Sheets

REFRIGERATOR HAVING AN AIR CIRCULATION SYSTEM

RELATED INVENTION

This invention is related to inventions disclosed in U.S. application Ser. No. 08/553,443 filed Nov. 11, 1995, and U.S. application Ser. No. 08/537,789 filed Oct. 23, 1995.

BACKGROUND OF THE INVENTION

This invention relates to a refrigerator having a cool air passage capable of circulating cool air into a refrigerating compartment.

As shown in FIG. 1, a conventional refrigerator is constituted by mounting a freezing compartment door 6 and a refrigerating compartment door 7 on a refrigerator body 4 of a thermally insulated structure forming a freezing compartment 2 and a refrigerating compartment 3 which are partitioned from each other by an intermediate partition wall 1 therebetween.

A compressor 11 is installed in a motor compartment 11M that is positioned under the refrigerating compartment 3, a condenser and capillary tube (not shown) are mounted in the interior of the body 4 or placed in the machine compartment 11M, and an evaporator 12 is mounted on the rear wall of the freezing compartment 2. The components are connected to each other by refrigerant tubes (not shown) to perform a refrigeration cycle.

A fan 13 for forcing cool air from the evaporator 12 into the freezing compartment 2 and the refrigerating compartment 3, is disposed above the evaporator 12. In order to guide the flow of the cool air, a grill 14 is placed before the fan 13 and a cool air duct 15a is disposed at the rear wall of the refrigerating compartment 3. Here, numeral 19 indicates a control damper for controlling the quantity of cool air which is introduced into the refrigerating compartment 3, and numeral 8 indicates shelves for receiving food items.

As a method for supplying cool air to the refrigerating compartment, a conventional refrigerator generally adopts a shelf-by-shelf cool air discharged method. As shown in FIG. 2, in this method a plurality of vertically spaced cool air discharge openings 16a, which are provided for several areas partitioned by the shelves 8, is arranged on the cool air duct 15a, so cool air is discharge towards the front into each area formed by the plurality of shelves 8.

In the above shelf-by-shelf cool air discharge method, uniform distribution of the cooled air is not achieved since areas in the direct path of the flowing air receive more cooled air than the remote areas. Arrangement of the food items further contributes to this problem. As an example, a bulky food item near a cool air discharge opening blocks the flow of air, thus such an area receives less cooled air. Still a further problem exists in that since the cool air discharge openings 16a are perpendicular to the flow direction of cool air going through the cool air duct 15a, only a small portion of the cool air from the evaporator 12 passes through the upper cool air discharge openings, but most of the cool air flows down through the cool air duct 15a and discharges into the refrigerating compartment 3 through the lowest cool air discharge openings 16a. Accordingly, food items on the upper shelves of the refrigerating compartment 3 can not keep a proper refrigerating temperature, whereas the food items on the lower shelves are overcooled. Another problem exists in that some newly stored food items may be at an initial temperature significantly higher than the temperature in the cooling compartment. In this case, a need arises for concentrating the cooled air flow to the warm/hot food item to effect rapid cooling as well as to avoid warming of the immediately surrounding food items. Conventional systems do not offer such a compensating means. Accordingly, the above described situations contribute to an undesired condition in which there may exist a significant variation of temperatures throughout the cooling compartment.

In an attempt to distribute the cool air more evenly, a three-wall cool air discharging method has recently been developed. As shown in FIG. 3, a refrigerator according to this method has a plurality of cool air discharge openings 16s on the side walls of the refrigerating compartment 3 as well as the cool air discharge openings 16a on the rear wall of the refrigerating compartment 3, in order to discharge cool air from the side walls as well as the rear wall.

However, such a refrigerator fails to provide a uniform air flow throughout the cooling compartment. That is, there still exist areas such as corners, which are not directly exposed to the cooled air flow. Furthermore, such a refrigerator does not offer means to concentrate the cooled air flow to a specified area depending upon the detected condition of the cooling compartment.

The above-explained inadequacies of conventional refrigerators are especially clear in the case that food items of a higher temperature are stored at remote areas such as the upper or lower corners of the refrigerating compartment.

Since larger-capacity refrigerators suffer from the above problems more noticeably and since consumer demand for such refrigerators has been increasing, the need for solving the above problems has become increasingly important.

SUMMARY OF THE INVENTION

It is, accordingly, an object of this invention to provide a refrigerator capable of maintaining an uniform temperature over the whole volume of a cooling compartment by evenly dispersing the evaporated cool air in multi-directions.

It is a further object to provide a refrigerator capable of achieving concentrated refrigeration of a specified area of the compartment depending upon detected temperatures.

In accordance with advantageous features of the present invention, a refrigerator is provided with an air distribution apparatus disposed on one wall of a refrigerating compartment, an air guiding means disposed in the air distribution apparatus in a vertical manner and for dividing the volume of the cool air introduced from the upper portion of the air distribution apparatus, and an air distribution means disposed at the front of the air guiding means and for horizontally discharging the divided air through a plurality of openings formed at the front area of the air distribution apparatus.

Alternatively, a refrigerator is provided with an air distribution apparatus disposed on one wall of a refrigerating compartment, and an air distribution means disposed in the air distribution apparatus for horizontally discharging an air divided volume of the cool air introduced from the upper portion of the air distribution apparatus through a plurality of openings formed at the front area of the air distribution apparatus.

DETAILED DESCRIPTION OF THE PREFERRED EMBODIMENTS

Figure 1:
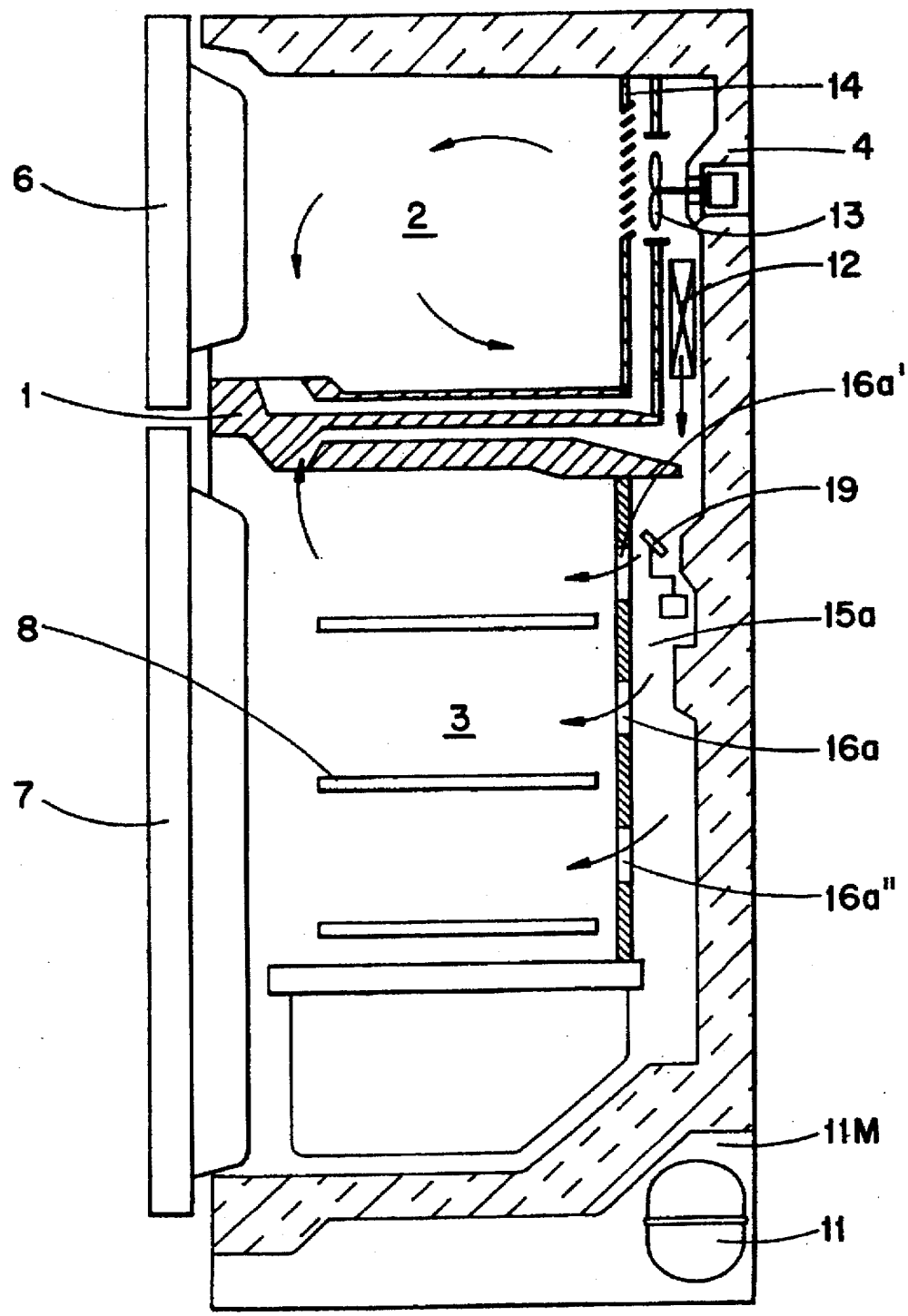
FIG. 1 is a side cross-sectional view of a refrigerator according to a prior art.
Figure 2:
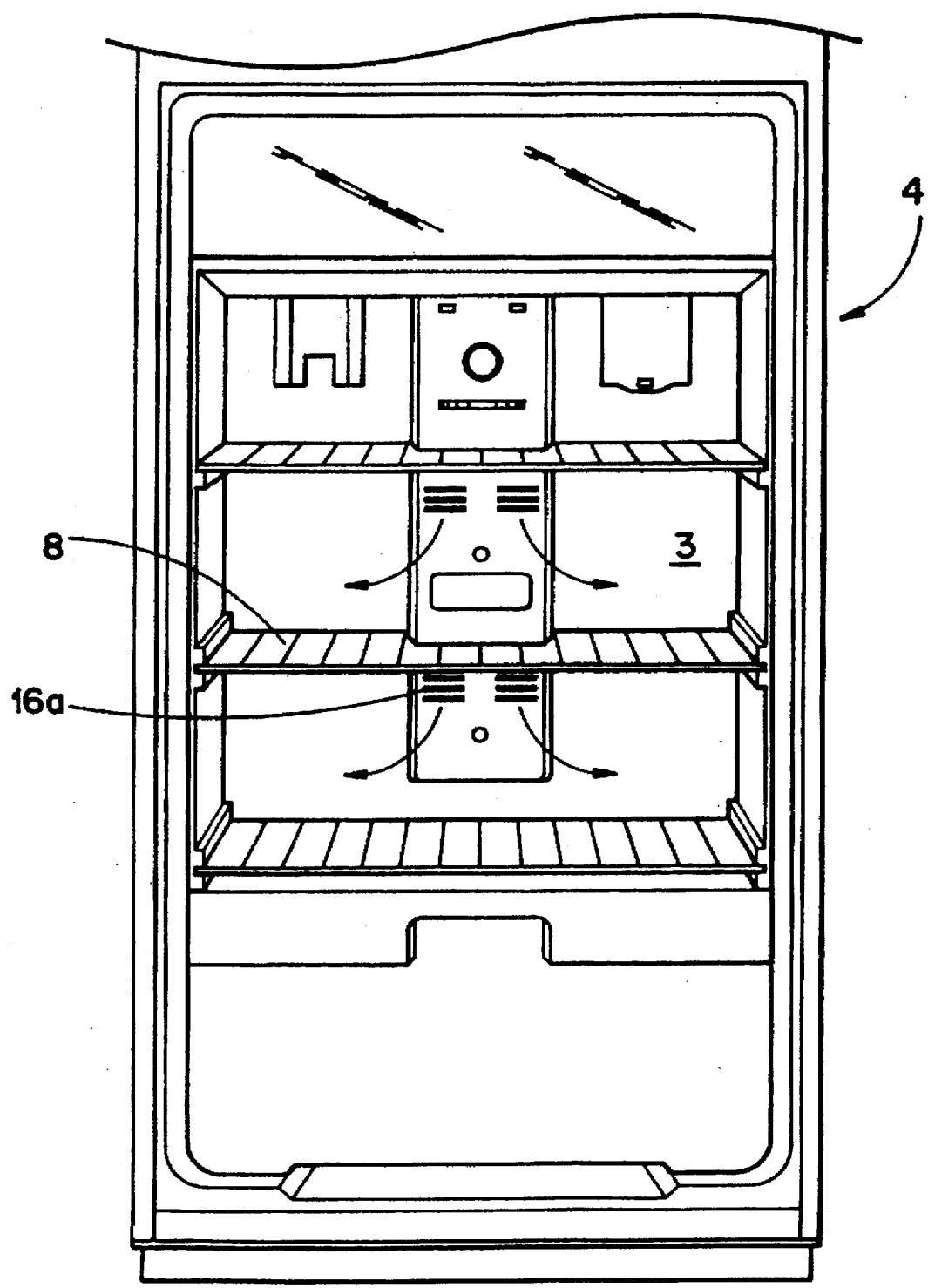
FIG. 2 is a front view of a refrigerator adopting a shelf by shelf cool air discharging method according to a prior art.
Figure 3:
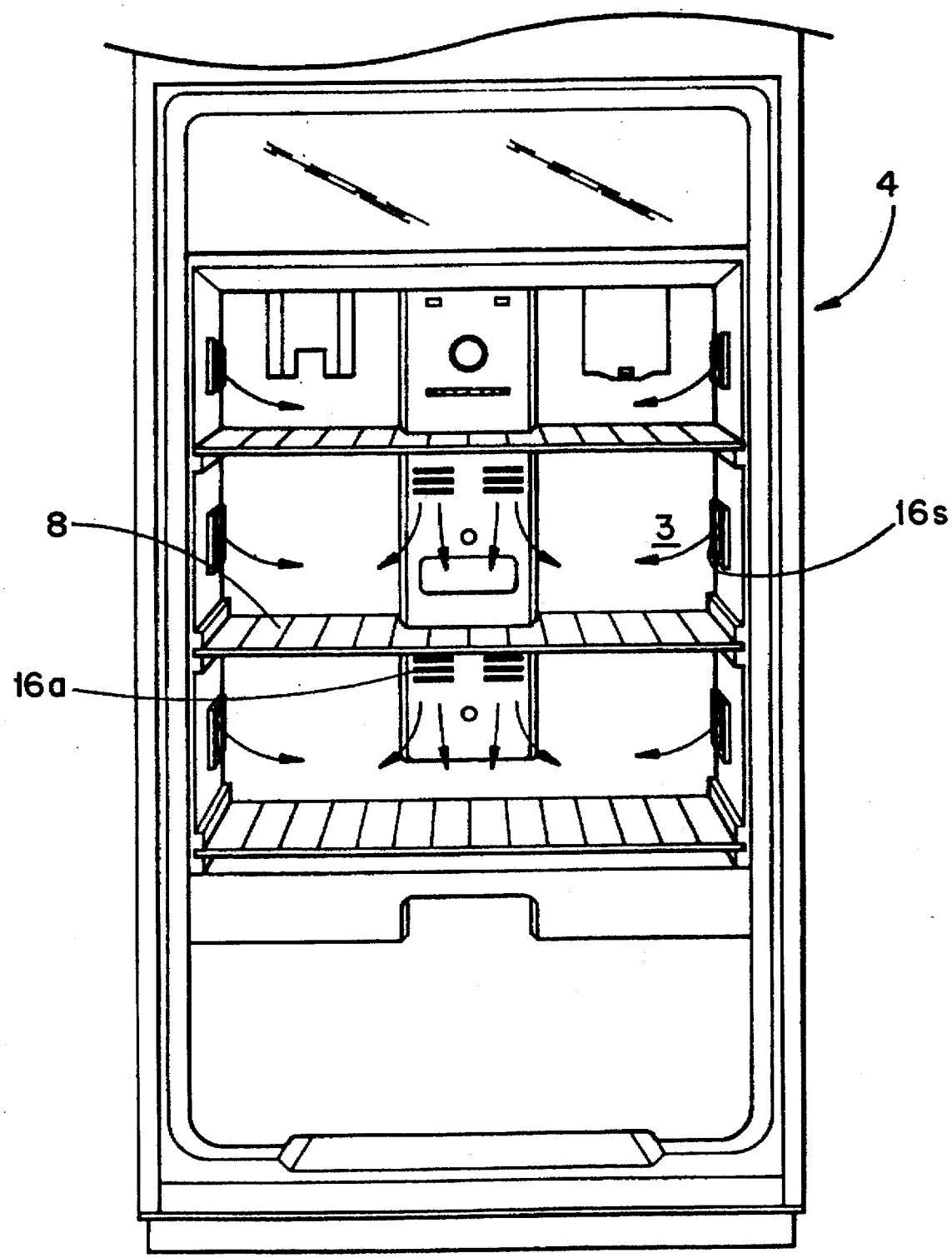
FIG. 3 is a front view of a refrigerator adopting three wall cool air discharging method according to a prior art.
Figure 4:
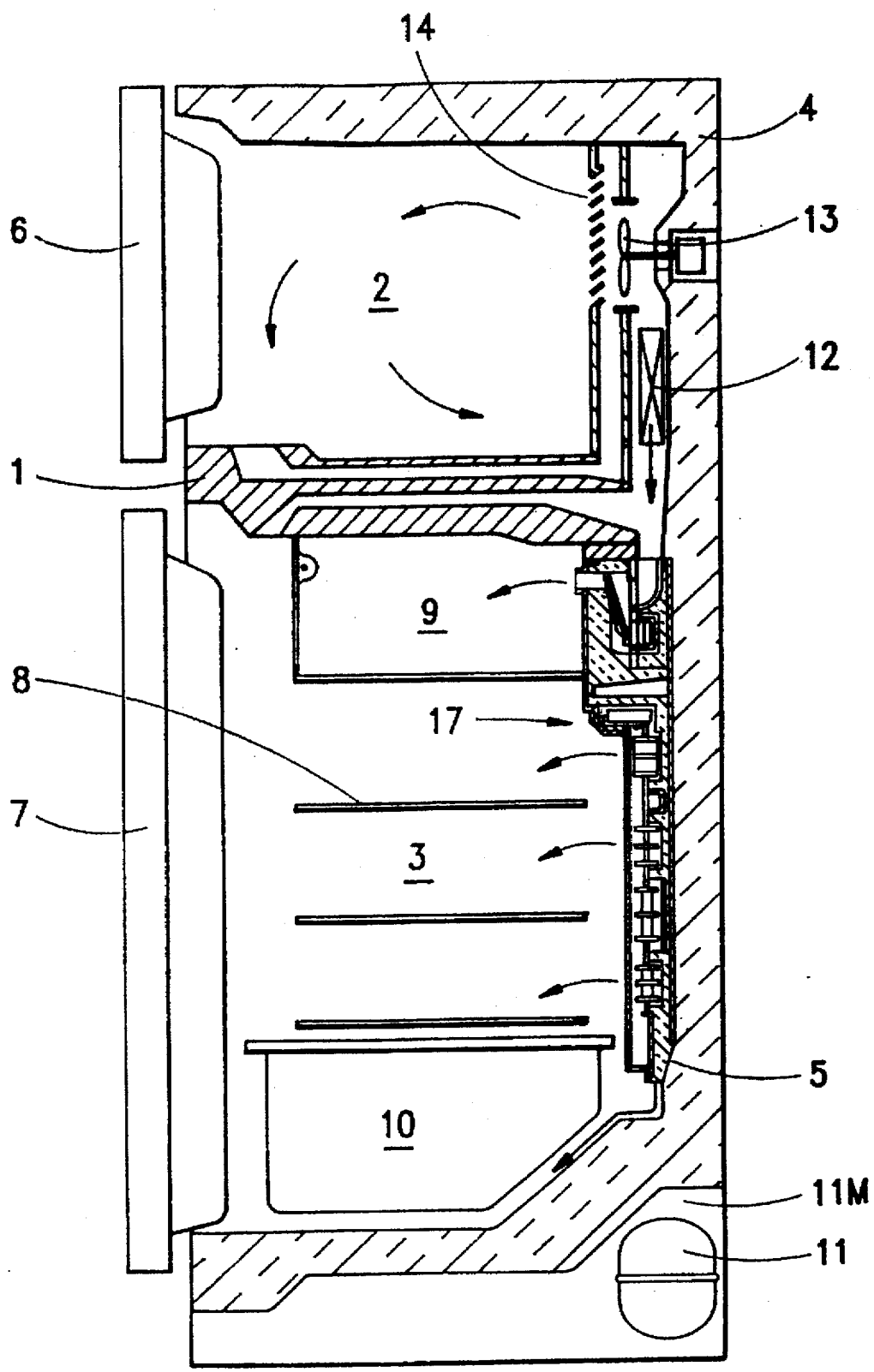
FIG. 4 is a side cross-sectional view of a refrigerator according to the present invention.

FIGS. 4 to 15 illustrate various embodiments of a cool air distribution apparatus having an air guiding means. In FIG. 4, the refrigerator is comprised of a body 4 shielded by an insulating material which includes a freezing compartment 2 and a refrigerating compartment 3, partitioned by an intermediate wall 1. Further, respective compartments 2,3 are equipped with doors 6,7 on the front side of the compartments 2,3. In the refrigerating compartment 3 are installed a plurality of shelves 8 for placing foodstuffs. At the upper portion of the refrigerating compartment 3 is formed the third compartment 9 for allowing the foodstuffs to be stored within a temperature range relative to the individual characteristics of the specific foodstuffs. A vegetable compartment 10 is formed at the lowest portion of the refrigerating compartment 3. A compressor 11 is installed in a motor compartment 11M, and a condenser and a pressure reducing device, which are not shown are installed in the wall of the body 4 or in the motor compartment 11M. Further, the evaporator 12 is mounted in the rear wall of the freezing compartment 2. All of the components are interconnected by a refrigerant tube (not shown) for accomplishing the refrigerating cycle.

Above the evaporator 12 is installed a fan 13 for forcefully blowing the cool air generated from the evaporator 12 into the freezing compartment 2 and the refrigerating compartment 3. To guide the cool air, a grill 14 is mounted in front of the fan 13. At the rear wall of the refrigerating compartment 3 is mounted a cool air distribution apparatus 17 having a cool air passage and discharge openings which will be explained later. Thus, the cool air generated by the evaporator 12 is divided between the freezing compartment 2 and the refrigerating compartment 3. Numeral 5 is a recess for housing the cool air distribution apparatus 17.

Figure 5:
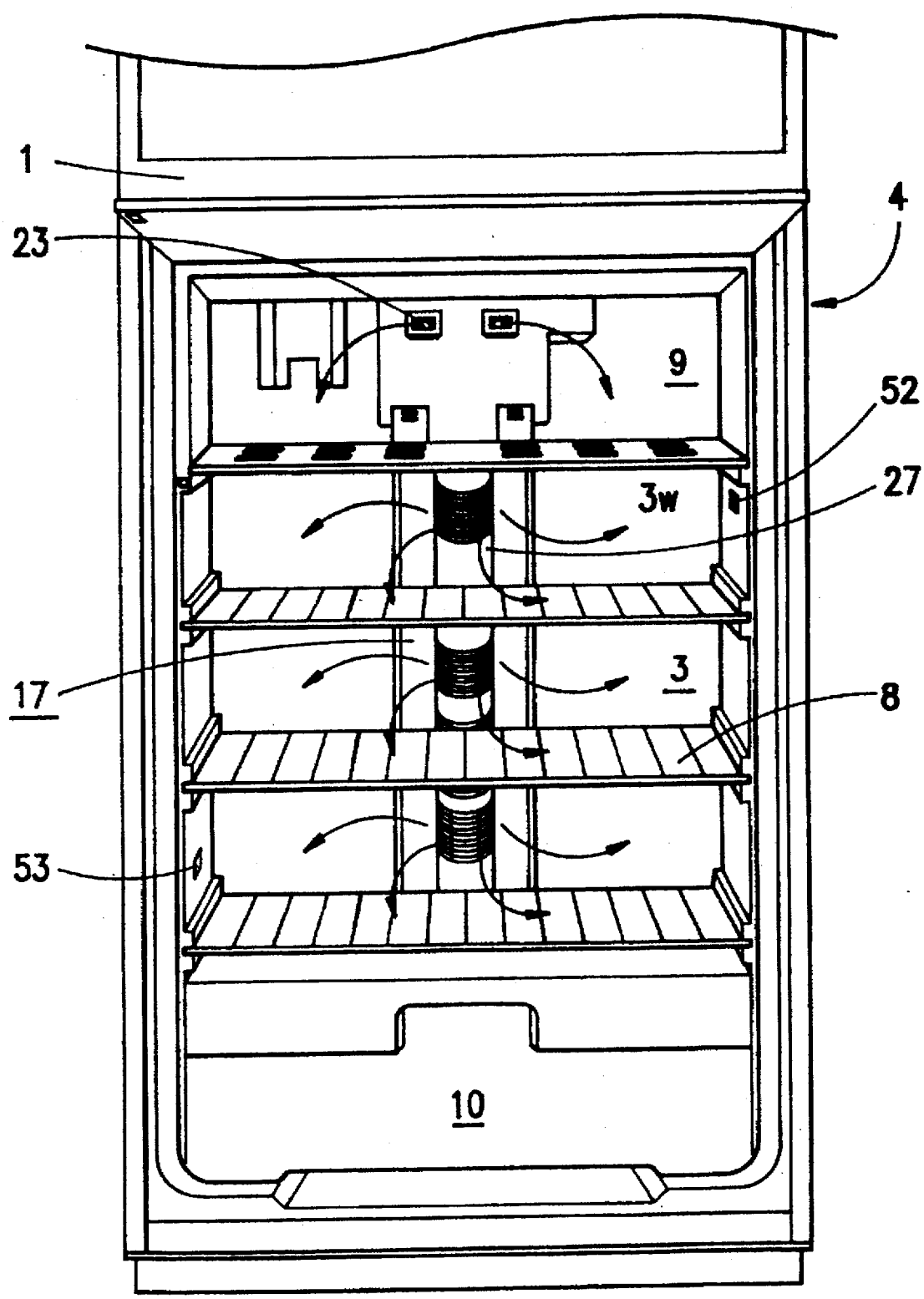
FIG. 5 is a front view of a refrigerator of FIG. 4 with a door opened.

As shown in FIG. 5, the cool air distribution apparatus 17 is installed at the horizontally central portion of the rear wall 3W of the refrigerating compartment 3. An upper portion of the air distribution apparatus 17 is positioned behind the third compartment 9, while a middle and a lower portion of the air distribution apparatus 17 are positioned behind the area of the refrigerating compartment 3 excluding the third compartment 9 and the vegetable compartment 10. That is, the upper end of the air distribution apparatus 17 is placed adjacent to the intermediate wall 1, and the lower end thereof is placed adjacent to the vegetable compartment 10. The entire height of the air distribution apparatus 17 approximately equals the height of the refrigerating compartment 3 plus the third compartment 9.

Figure 6:
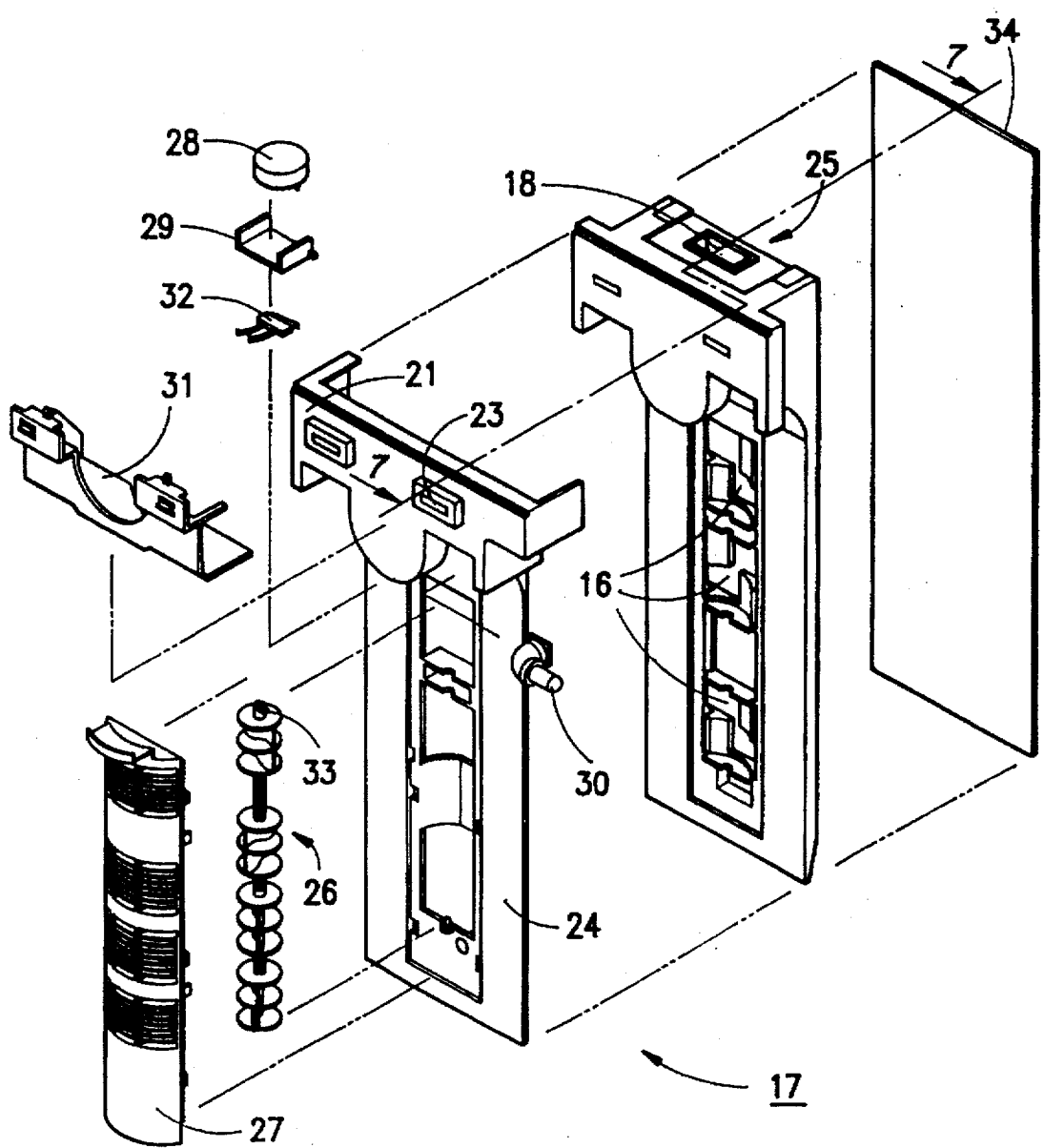
FIG. 6 is an exploded perspective view of a cool air distribution apparatus according to the present invention.

The cool air distribution apparatus 17, as shown in FIG. 6, comprises a front plate 24 made from a synthetic resin, a rear plate 25 which is made from insulated material and assembled with the front plate 24, and a seal plate 34 covering the back face of the rear plate 25. A set of a cool air distributing or directing means of the present invention, which will be described later in various ways, or a swing-wing 26 is detachably provided at the front surface of the front plate 24. At the upper end of the swing-wing 26 is provided a motor 28 for operating the swing wing 26. The motor 28 is seated on a motor case 29 in the upper portion of the front plate 24. At each side end of the motor 28 is mounted an indoor lamp 30. Numeral 31 is a lamp cover for shielding the lamp 30.

In the embodiment, since the motor 28 is seal-mounted at the upper portion of the swing-wing 26, moisture from the compartment can not penetrate into the motor 28. Because the moisture or the condensed water flows down due to the force of gravity even when the formation of moisture or the condensed water occurs, there is no worry about its penetration into the motor 28. Further, there is less possibility of moisture penetration due to the motor being housed by the case 29. The excess cooling caused by the decrease of the motor speed can not occur due to the indirect contact of moist air. Even if the water penetrates, the water is immediately evaporated by the heat from the lamp 30 mounted nearby, thereby preventing the problem of inoperability of the motor 28 due to the penetration of the water and further, the non-function of the swing-wing 26. Thus, this has the advantage that a decrease of the motor speed, with respect to poor electrical contact, an insulation failure due to the penetration of the moisture, and an excess cooling due to the frost of the penetrating water, never occurs. In the embodiment, a geared motor of which the rotation speed is fixed is employed as the operating motor. However, a stepping motor can be employed to control the rotation speed of the swing-wing in the forward and the reverse directions.

Numeral 32 references a position sensing switch for controlling the rotation position of the swing-wing 26, the switch being operated by a protuberance 33 provided at the upper end of the swing-wing 26. The quantity of the position sensing switch 32 corresponds to the number of respective swing-wings which will be installed in accordance with respective embodiments. Numeral 27 is a grill detachably assembled with the front plate 24 for the protection of the swing-wing 26. The grill 27 prevents foodstuffs housed in the compartment from prohibiting the rotation of the swing-wing 26.

Figure 7:
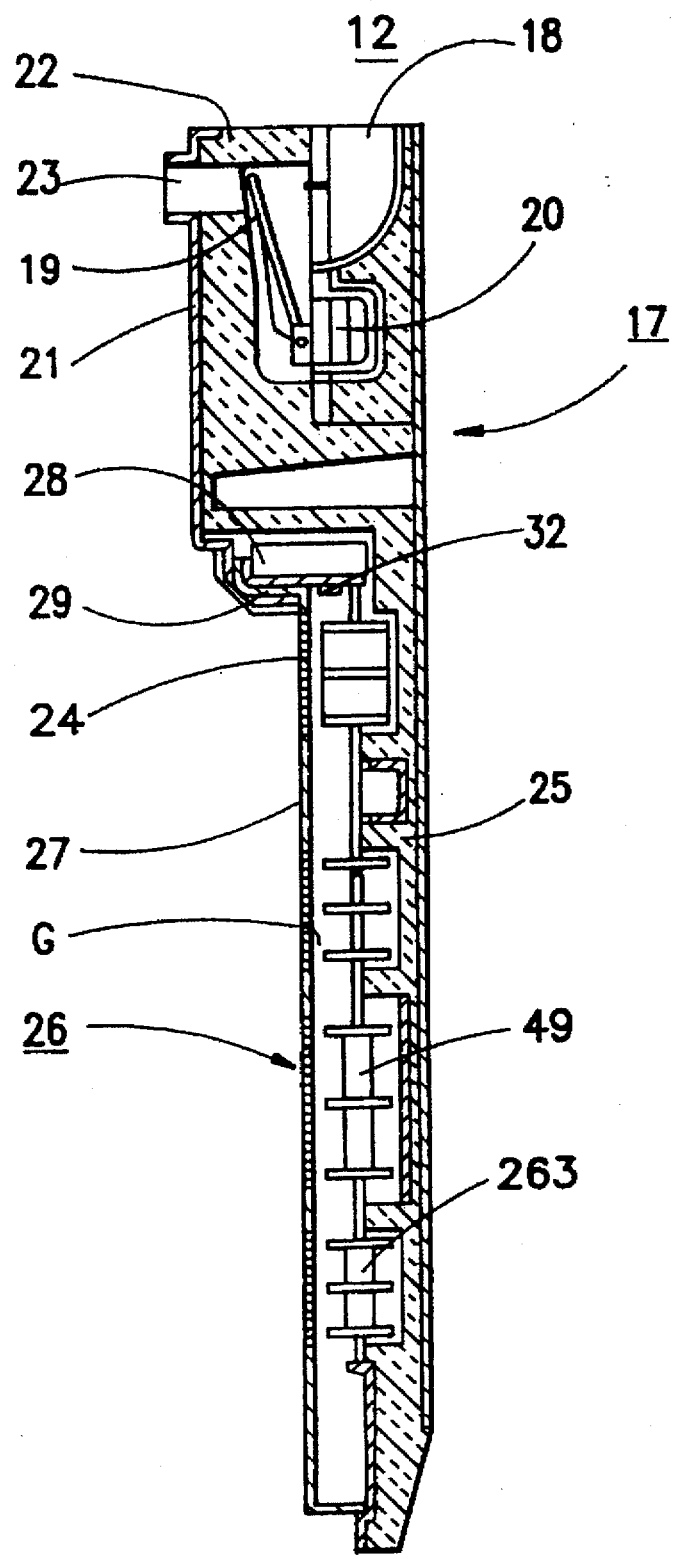
FIG. 7 is a side cross-sectional view of the cool air distribution apparatus taken along line 7—7 in FIG. 6.

In FIG. 7, the upper portion of the air distribution apparatus 17 comprises an air passage 18 for guiding the flow of the cool air generated from the evaporator 12, a baffle plate 19 for regulating the cool air volume fed into the refrigerating compartment 3 according to the opening/shutting of the baffle plate 19, and a motor 20 for operating the baffle plate 19. The temperature control effected by these components is achieved by the conventional method. Numeral 21 is a baffle cover and is integrally formed with the front plate 24 in the embodiment. Numeral 22 is a spacer which is made from an insulated material. The thickened spacer 22 prevents the cool air passing through the air passage 18, from generating frost on the outside wall of the baffle cover 21. Numeral 23 is an air discharge opening which is provided at the upper portion of the front plate 24, by which the cool air through the air passage 18 is discharged into the third compartment 9. In the embodiment, a couple of the discharging openings 23 are formed at the upper portion of the front plate 24. Therefore, the third compartment 9 is at a lower temperature than the refrigerating compartment 3, since the travelling distance of the air from the air passage 18 to the air discharging opening 23 is shorter than that from the air passage 18 to the middle and lower portions of the air distribution apparatus 17, so less heating of the air occurs. The swing-wing 26 is disposed at the front of the middle and lower portions of the front plate 24. The configuration of the swing-wing 26 of the present invention will be explained in detail later.

The distribution apparatus 17 is detachably installed on the rear wall 3W, and it is more desirable that the front plate 24 is placed against an even surface with respect to the rear wall 3W of the refrigerating compartment 3. That is, as shown in FIG. 6, the seal plate 34 adheres to the rear side of the rear plate 25 which is assembled to the front plate 24, and the swing-wing 26 and the grill 27 are attached to the front plate 24, and then the motor 28 and the indoor lamp 30 are assembled. Finally, the assembly is inserted in the rear wall 3W (FIG. 5). Therefore, in comparison to a prior art apparatus in which many individual components are installed in the refrigerating compartment, respectively, the installation work using the components of the present invention is more simple.

Figure 8:
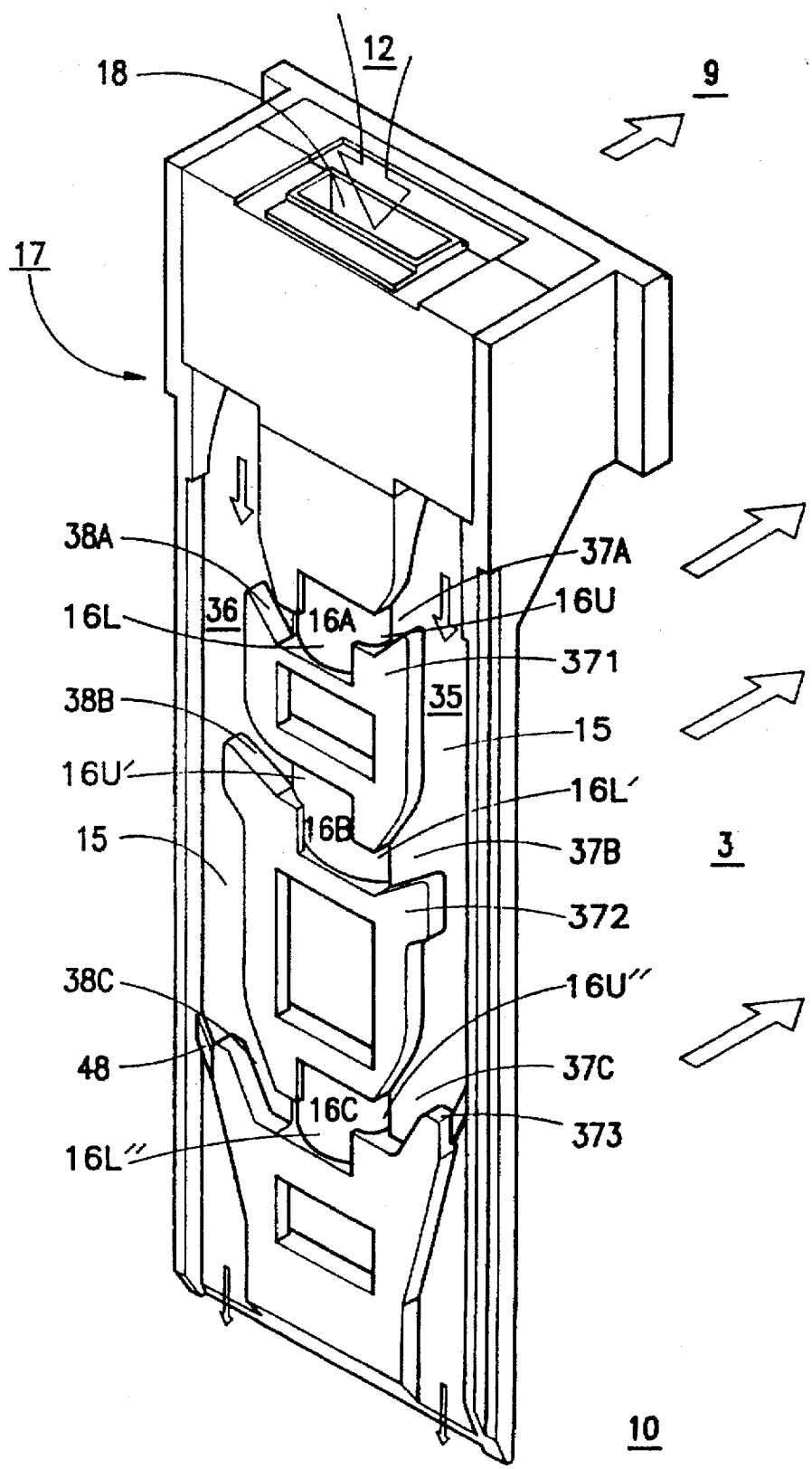
FIG. 8 is a rear perspective view of the cool air distribution apparatus.

In FIG. 8, the air distribution apparatus 17 comprises an air passage 15 and openings 16A, 16B, 16C which discharge the air from the air passage 15 into the refrigerating compartment 3. The air passage 15 is formed in a longitudinal direction at the rear surface of the air distribution apparatus 17. The openings 16A,16B,16C interconnect the air passage 15 and the refrigerating compartment 3. The openings 16A,16B,16C are vertically spaced along the vertical center line of the apparatus 17. The air passage 15 includes a first duct 35 and a second duct 36, each of which is arranged adjacent to one of the vertical edges of the apparatus 17 such that the ducts 35,36 straddle the openings 16A, 16B,16C. The position of respective openings 16A,16B,16C corresponds with the partitioned space between the shelves 8 of the refrigerating compartment 3. The uppermost opening 16A is disposed at ¾ H, the middle opening 16B at ½ H, and the lower opening 16C at ⅓ H, assuming that the height of the refrigerating compartment 3 is "H". The air passage 15 has first and second ducts 35,36 at each vertical side, and the wing member 26a is placed ahead of the openings 16, where the thickness of the air distribution apparatus 17 is thinnest. Thus, the extent to which the distribution apparatus 17 protrudes into the refrigerating compartment 3 is minimized, to maximize the available volume of the refrigerating compartment 3.

The upper portion of the first and second ducts 35,36 is expanded toward each side of the air passage 18, respectively, while the lower portion of the ducts 35,36 is expanded toward the vegetable compartment 10. The air passing through the air passage 18 flows into the first and second ducts 35,36. Most of the air flows down along the ducts 35,36 to be discharged into the refrigerating and vegetable compartments 3, 10. The remaining volume of the air is discharged toward the third compartment 9 through the discharging opening 23 (FIG. 8).

For guiding the down-flowing air into the refrigerating compartment 3, the air passage 15 comprises first branch ducts 37A–37C which interconnect the first duct 35 and respective openings 16A–C, and second branch ducts 38A–C which interconnect the second duct 36 and respective openings 16A–C. Thus, the air flowing along the first and second ducts 35,36 is guided to the first and second branch ducts 37A,37B,37C,38A,38B,38C, thereby discharging into the refrigerating compartment 3 through respective openings 16A,16B,16C. A wide inlet of each of the branch ducts has the configuration that the upper portion thereof is rounded and the lower portion is shaped as a shoulder 371,372,373 in which the middle shoulder 372 is extended farther horizontally outwardly (the right and the left hand of FIG. 8) than the uppermost shoulder 371, and the lower shoulder 373 is extended farther outwardly than the middle shoulder 372. Therefore, since the air traveling along the first duct 35 and the second duct 36 becomes progressively warmer, a greater amount of air is needed to be discharged through the lower openings 16 in order to achieve a uniform temperature within the refrigerating compartment. The configuration of the branch ducts 37,38 as described above is very helpful to ensure that result.

Furthermore, to feed the cool air to the right or left portions of the refrigerating compartment 3, the opening 16A comprises an upper portion 16U and a lower portion 16L, the upper portion 16U being offset toward the first branch duct 37A with respect to the second branch duct 38A, while the lower portion 16L is offset toward the second branch duct 38A with respect to the first branch duct 37A. The air through the portions 16U,16L of the opening 16A is discharged in different directions, thereby causing the smooth discharge flow without a head-to-head collision of the air flows in the refrigerating compartment 3. Next, in the opening 16B adjacent to the opening 16A, the position of the upper, lower portions 16U',16L" are reversed with respect to that of upper, lower portions 16U,16L. That is, the upper portion 16U' is offset toward the first branch duct 37B, while the lower portion 16L' is offset toward the second branch duct 38B. Further, at the lowest opening 16C, the position of the upper, lower portions 16U",16L" are reversed with respect to that of the upper, lower portions 16U',16L'. That is, the position of the upper, lower portions 16U',16L' are the same as that of the upper, lower portions 16U,16L of the upper opening 16A. As noted above, the temperature of the air reaching the second branch duct 38A is higher than that of the air reaching the first branch duct 37A. Alternatively, at the opening 16B, the relation of the temperature is reversed. Also, at the opening 16C, the relation of the temperature is the same as at the uppermost opening 16A. That tends to make the temperature at the right and the left sides of the refrigerating compartment more uniform.

Figure 9:
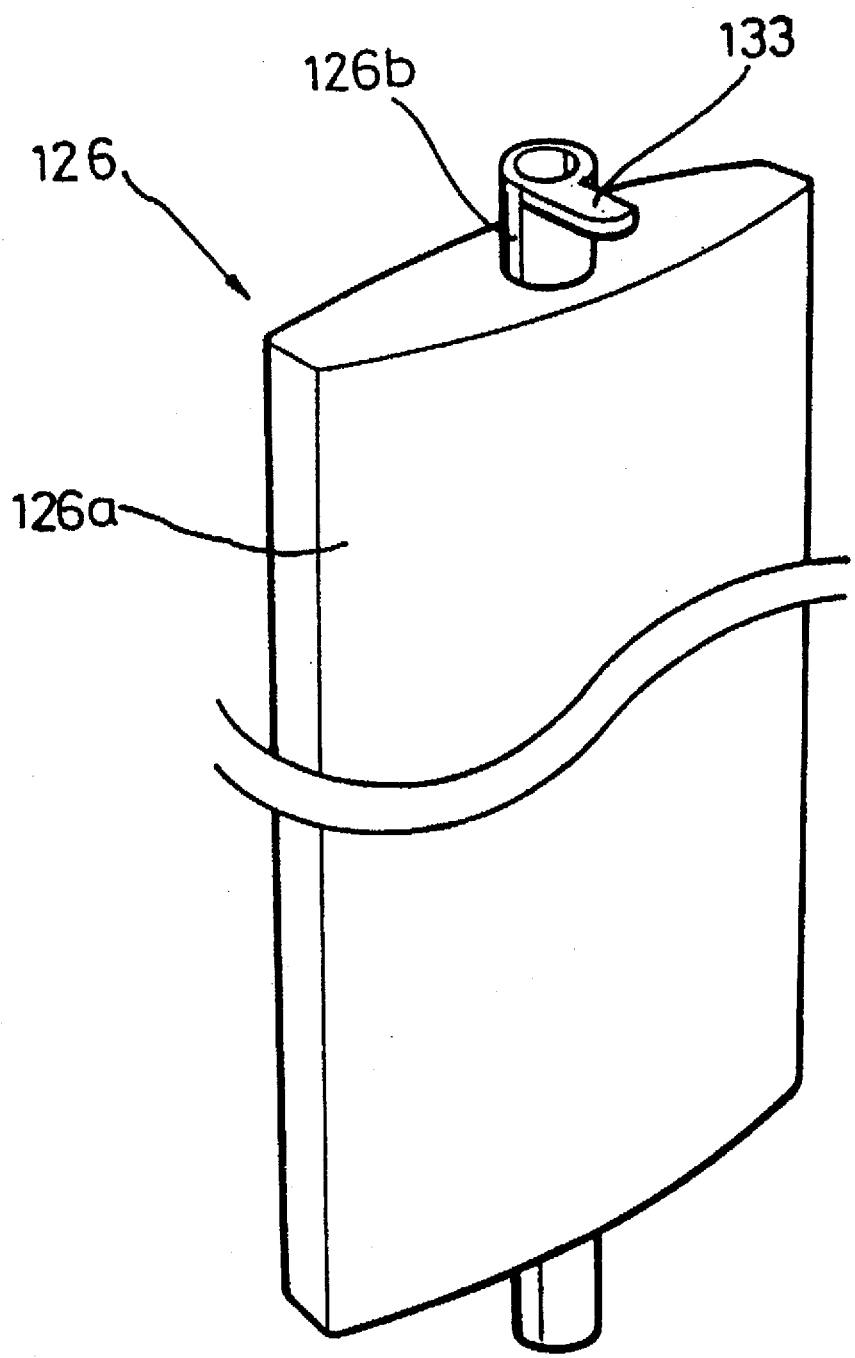
FIG. 9 is a perspective view of a first embodiment example of an air distributing means.

FIG. 9 shows a first embodiment of the swing-wing or air distributing means 126. The swing-wing 126 comprises a wing member 126a and a columnar member 126b. The wing member 126a is formed as a plate extending vertically, and is integrally assembled to the columnar member 126b. The columnar member 126b is extended along the longitudinal center of the wing member 126a which is used as the rotating shaft of the wing member 126a. The upper end of the swing-wing 126 is connected to an output shaft of the driving motor (FIG. 6) to operate the swing-wing 126. Further, a protuberance 133 is provided at the upper end of the swing-wing 126 for controlling the rotation position of the swing-wing 126 when a localized air flow to the refrigerating compartment 3 is required. It is more desirable that a couple of swing-wings 126 are installed in the front of the openings 16A,16B,16C to evenly discharge the air coming into the refrigerating compartment 3 through respective openings. One of the swing-wings is rotatably disposed in the front of the openings while being offset toward the right portion of the openings. That is, the longitudinal center line of the columnar member 126b is disposed in front of the right-hand portions of the openings 16. The other swing-wing is rotatably disposed in front of left-hand portions of the openings.

First, the compressor 11 and the evaporator 12, in FIG. 4, are operated and the cool air is generated by the heat-exchange taking place with the circumference of the evaporator 12. The cool air is moved into the freezing 2 and the refrigerating compartment 3 by the fan 13 along the direction of the arrows in FIG. 4. Depending on the temperature of the refrigerating compartment 3 the shutting/opening operation of the baffle plate 19 (FIG. 7) is controlled. As the baffle plate 19 is opened, the cool air from the evaporator 12 is fed into the air passage 18 as shown in FIG. 8, and the air is divided between the right and the left side of the upper portion of the air distributing apparatus 17. A part of the cool air is discharged into the third compartment 9 through the air discharge opening 23 (FIG. 5), while most of the cool air is discharged into the refrigerating 3 and the vegetable compartment 10 after flowing along the first duct 35 and the second duct 36.

In FIG. 8, the air along the ducts 35,36 is guided by the respective branch ducts 37A-C,38A-C so as to be discharged through the openings 16. Further, the air through the openings is distributed to the right or the left side by the rotation of the swing-wing 126 for generating even cooling of the refrigerating compartment.

However, in the specified area, if too many foodstuffs are provided or a relatively hot food is disposed, the temperature becomes unbalanced. To solve the problem, a concentrated cooling in the warmer area needs to be employed.

Figure 10A:
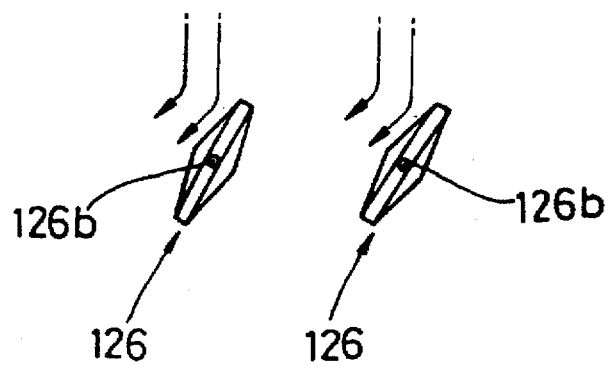
FIG. 10A is a plan view of FIG. 9 showing the swing-wing system when in a left side localized cooling position.
Figure 10B:
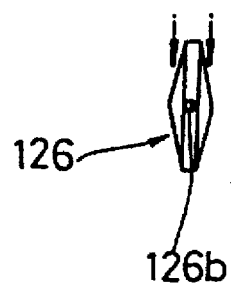
FIG. 10B is a plan view of FIG. 9 showing the swing-wing system when in a central area localized cooling position.
Figure 10C:
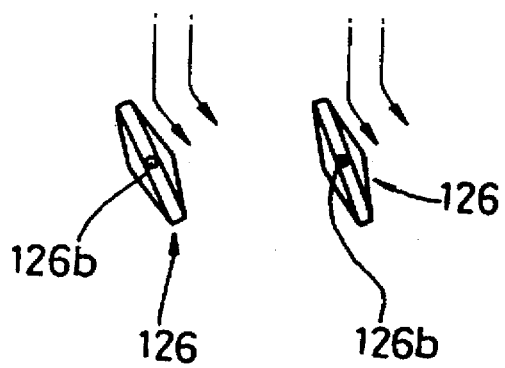
FIG. 10C is a plan view of FIG. 9 showing the swing-wing system when in a right side localized cooling position.

FIGS. 10A, 10B and 10C show states of left-side cooling, central cooling and right-side cooling, respectively. The concentrated cooling can be achieved by aiming the air flow toward a predetermined direction under the command of the control system. To determine the direction of the concentrated cooling, i.e., the discharge direction of the cool air, a right space or first temperature sensor 52 is installed at the upper central portion of the right wall of the refrigerating compartment 3 and a left space or second temperature sensor 53 is installed at the lower central portion of the left wall of the refrigerating compartment 3 as shown in FIG. 5. The temperature sensors 52,53 as well as the position sensing switch 32 (FIG. 6) are connected to a control member (not shown) by a conventional method. Further, the motor 28 for rotating the swing-wing 126 is connected to the control member. These components can detect a temperature variance in the refrigerating compartment and achieve the effective concentrated cooling.

Figure 11A:
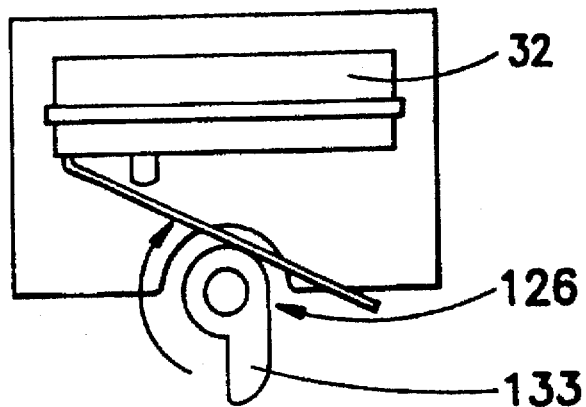
FIGS. 11A, 11B, 11C are operating views of a position sensing switch adopted to a cool air distribution apparatus.
Figure 11B:
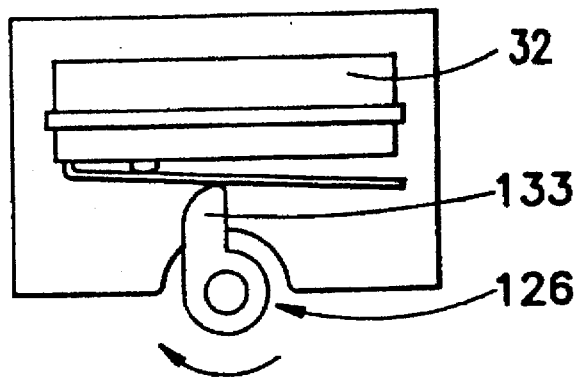
Figure 11C:
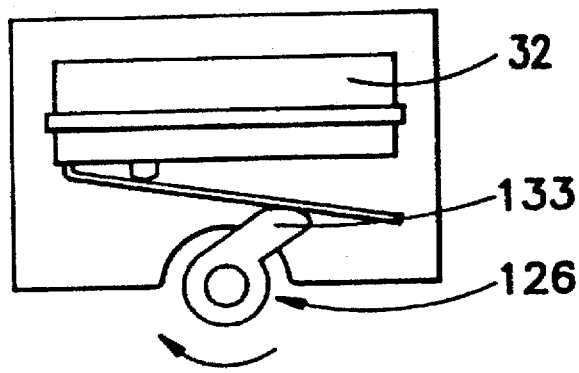

FIG. 11 illustrates the position sensing switch 32 which determines the datum position of the swing-wing 126, and the protuberance 133 which is rotated against the position sensing switch 32. The protuberance 133 rotates in the direction of the arrow together with swing-wing 26 so as to be operated as shown in FIGS. 11A, 11B, 11C. FIG. 11C shows the moment that the electrical point of the position sensing switch 32 is released. The protuberance has a contacting portion shaped in a smooth rounded manner for preventing any noise generated by the sudden release of the switch.

The amount rotation of the swing-wing 126 is controlled by a control member and the position sensing switch 32 is turned on and off by the protuberance 133 of the swing-wing 126. In the embodiment, the moment when the protuberance 133 is released from the position sensing switch 32 is set as the datum (reference) time (FIG. 11C). The time period of rotation of the swing-wing is checked by a control member, thereby producing the degree of the rotation. For example, assuming that the rotation speed of the swing-wing 126 is 6 rpm, the swing-wing 126 rotates during 10 seconds from the datum point, thereby rotating one turn.

Next, when the concentrated cooling is required for the left side, the swing-wing 126 is temporarily aimed toward the left direction so that the major part of the cool air flow is headed toward the left side as shown in FIG. 10A. Further, when the concentrated cooling is required to the center area, the swing-wing 126 is temporarily aimed in the central direction so that the major part of the cool air flow is headed toward the central area as shown in FIG. 10B. Furthermore, when the concentrated cooling is required for the right side, the swing-wing 126 is temporarily aimed toward the right direction so that the major part of the cool air flow is headed toward the right side as shown in FIG. 10C.

In the following descriptions of various embodiments of the swing-wing, the same numerals and letters are used for elements which function the same as those of the first embodiment, and a further description for the elements is omitted.

Figure 12:
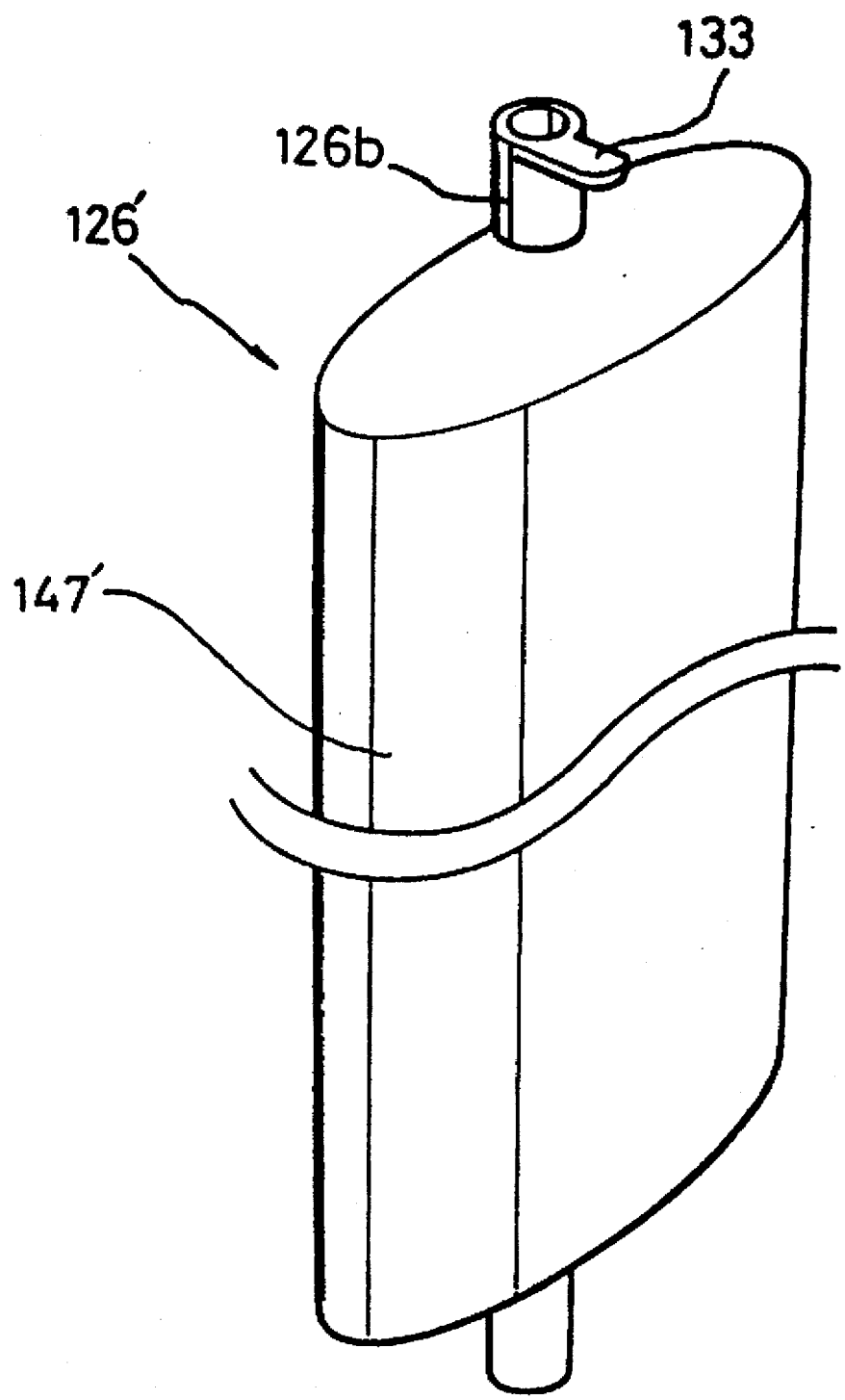
FIG. 12 is a perspective view of a modified example of the air distributing means of FIG. 9.

FIG. 12 shows a modified example of the first embodiment. The swing-wing 126' comprises a vertical columnar member 126b, and a distributing wing or vane 147' which is disposed on the columnar member 126b in an eccentric manner and is formed like an oval in a cross-section. It is more desirable that a couple of swing-wings 126' are installed at the front of the openings 16A,16B,16C as described in the first embodiment.

Figure 13:
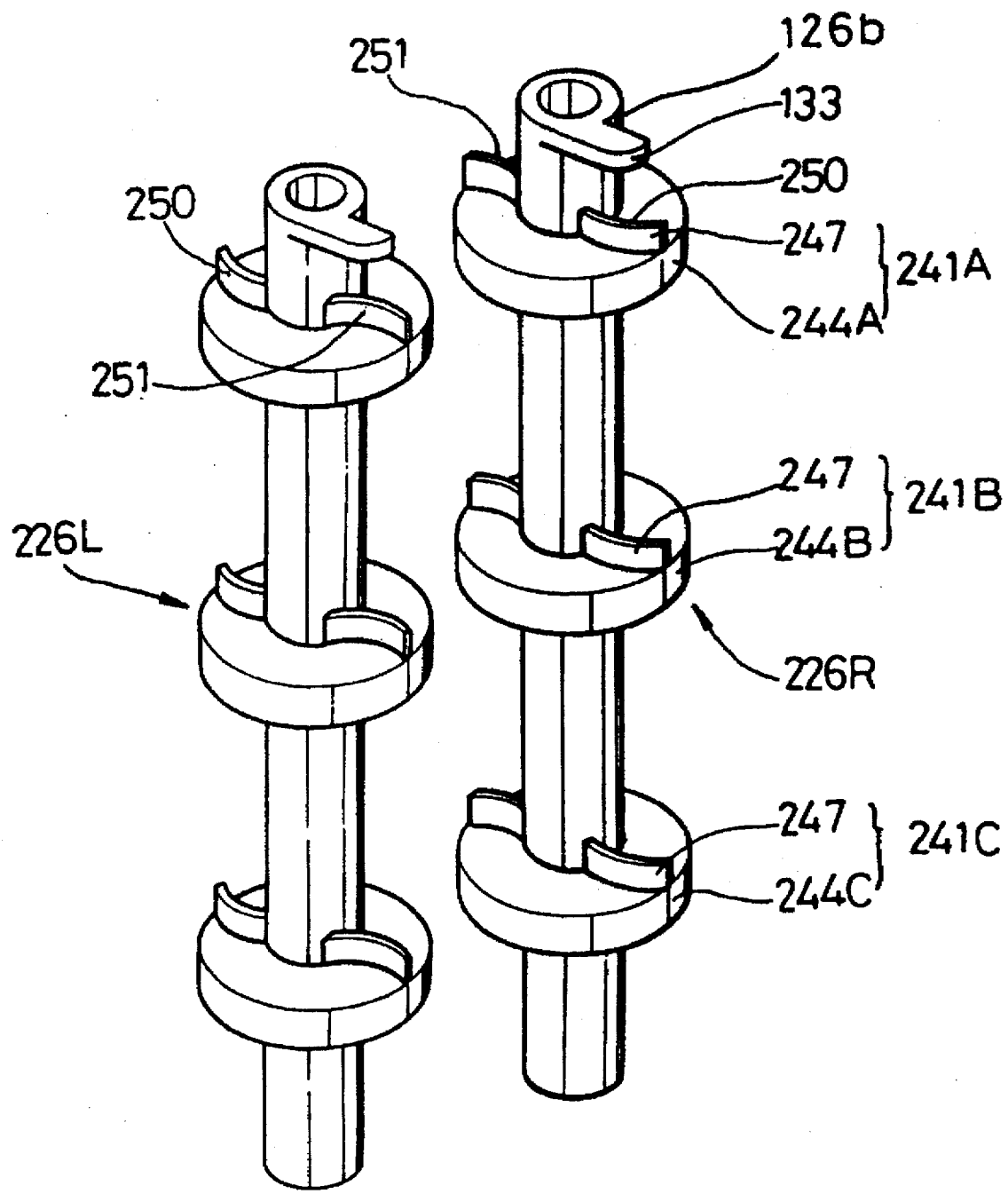
FIG. 13 is a perspective view of a second example of an air distributing means.

FIG. 13 shows a second embodiment of the swing-wings 226R,226L. Each swing-wing 226R,226L comprises a plurality of wing members 241A, 241B and 241C and a columnar member 126b, respectively. In this example, since the right portion 16U of the opening 16A of the air distributing apparatus 17 (FIG. 8) is offset with respect to the left portion 16L thereof, a couple of swing-wings may be employed to achieve the effective air discharge. That is, one of the swing-wings 226R is rotatably disposed in the front of the right portion 16U,16L' and 16U" of the opening's 16A,16B and 16C, while the other of the swing wings 226L is rotatably disposed in the front of the left portion 16L,16U' and 16L" of the openings 16A,16B and 16C. The wing member 241A comprises a dividing member 244A in the form of a rounded plate, and a distributing wing or vane 247 provided perpendicularly on the dividing member 244A. Each dividing member 244A,244B,244C is disposed at a lower boarder of the respective opening, i.e. this dividing member 244A of the right swing-wing 226R is at the lower boarder of the right portion 16U of the opening 16A, while the dividing member 244A of the left swing-wing 226L is at the lower boarder of the left portion 16L of the opening 16A. The diameter of respective dividing members 244A,244B and 244C approximately equals the width of the right or left portion of respective openings 16A,16B and 16C.

In the right swing-wing 226R, the distributing wing 247 is provided with a concave portion 250 and a convex portion 251 which are rounded in series, respectively. That is, the concave portion 250 is smoothly connected to the convex portion in a "S" shape. The height of the distributing wing 247 is the same as the height of respective right or left portions of respective openings. Utilizing that configuration of the distributing member on the dividing member, the direction of most of the cool air is controlled.

The distributing wing 247 of the left swing-wing 226L has a different orientation with respect to the right swing-wing 226R. In the right swing-wing 226R, the concave portion 250 extends in the same direction as the protuberance 133 of the columnar member 126b, while the convex portion 251 extends in the opposite direction. In the left swing-wing 226L, the convex portion 251 extends in the same direction as the protuberance 133 of the columnar member 126b, while the concave 250 extends in the opposite direction. The disposition of the distributing wing 247 is for reducing the flow resistance, corresponding to the disposition of the right, left portions 16U,16L of the opening 16A. The air guided by the distributing wing 247 impinges on the convex portion 251 largely, and flows over the convex portion 251, thereby remarkably reducing the flow resistance.

The cool air generated from the evaporator 12, as shown in FIG. 8, is mostly discharged into the refrigerating compartment 3 and the vegetable compartment 10 after flowing along the first duct 35 and the second duct 36. Thus, the air guided through the first branch duct 37A at the right side flows onto the convex portion 251 of the right distributing wing 226R, while the air guided through the second branch duct 38A at the left side flows onto the convex portion 251 of the left distributing wing 226L, which develops a main flow. Further, the horizontal plate-like dividing member keeps the weak air discharged in approximately a horizontal direction into the refrigerating compartment even when the swing-wing is in the slow rotation mode.

When a concentrated cooling is required for a specified area of the refrigerating compartment, the concentrated cooling as shown in FIGS. 10A, 10B, 10C is achieved by using the protuberance 133 provided at the upper end of the columnar member 126b.

Figure 14:
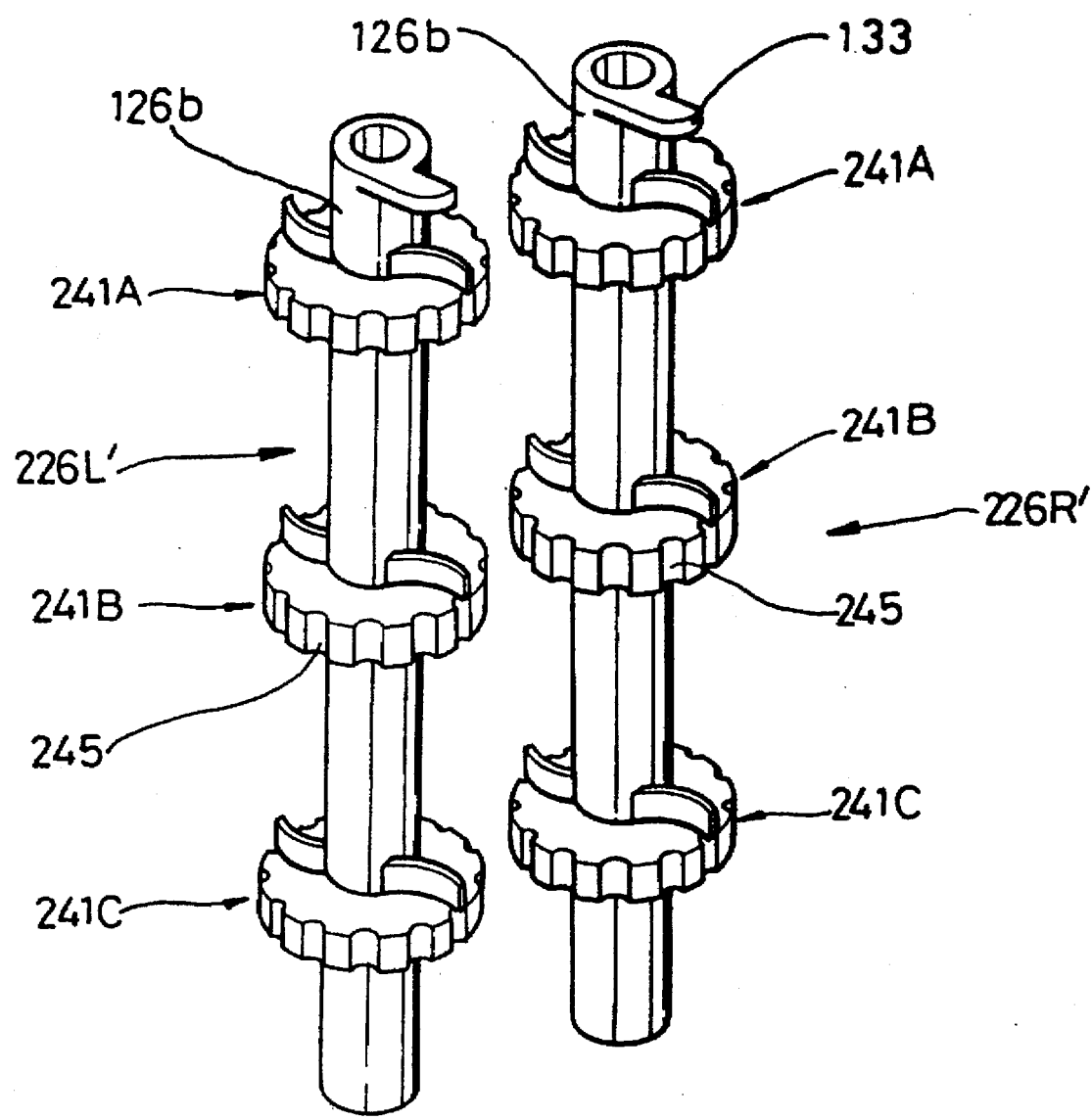
FIG. 14 is a perspective view showing a modified example of the air distributing means of FIG. 13.

FIG. 14 shows a modified example of the second embodiment. The swing-wing has the same components as the second embodiment in FIG. 13. Additionally, the swing-wing comprises a plurality of grooves 245 formed on the circumference of respective dividing members 241A,241B, 241C along the extented direction of the columnar member 126b. The grooves 245 are for the cool air which is not discharged through the grill 27 yet (FIG. 7). The remaining air above the dividing member 241A actively flows down through the grooves 245 as well as the gap G between the rear surface of the grill 27 and the circumference of the swing-wings 226R', 226L'.

Figure 15A:
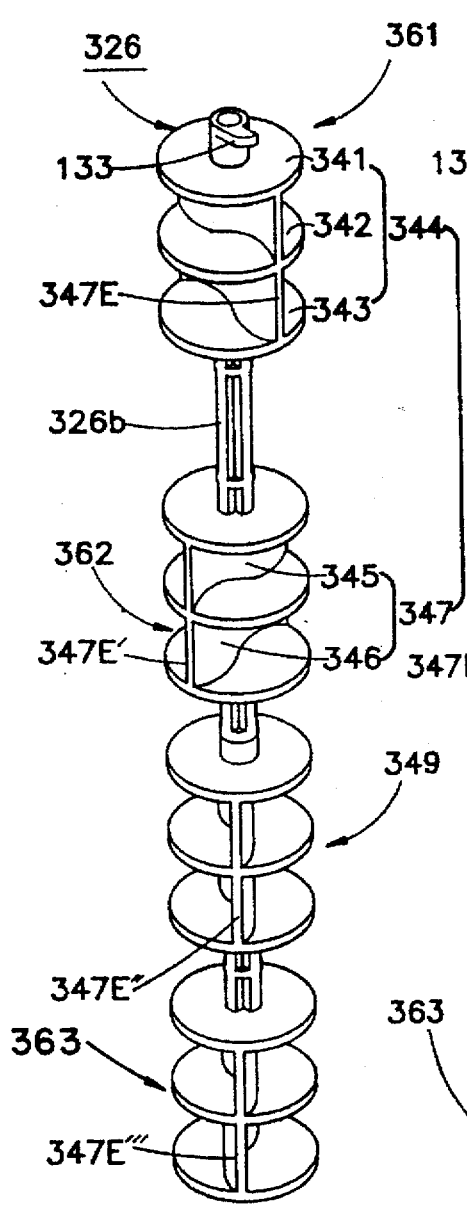
FIGS. 15A, 15B, 15C are perspective views of a third example of an air distributing means and modification embodiments thereof.
Figure 15B:
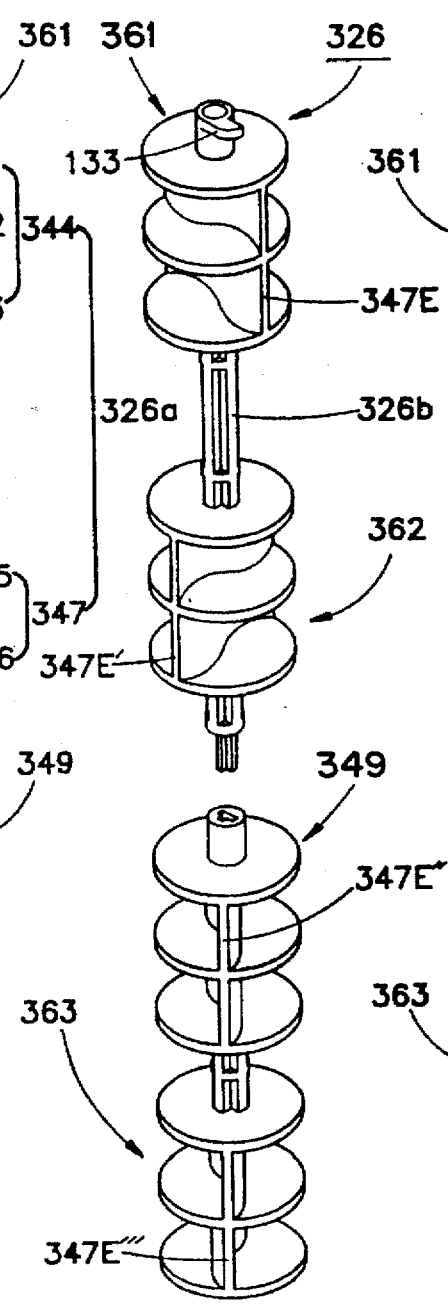

FIGS. 15A, 15B illustrate a third embodiment of the swing-wing 326. The swing-wing 326 comprises a plurality of wing members 326a and a columnar member 326b. The wing member 326a comprises a dividing plate 344 having an upper plate 341, a middle plate 342 and a lower plate 343 which are spaced apart from each other in a horizontal manner. The wing member 326a further comprises a distributing wing 347 which provides a first inducing wing 345 formed perpendicularly between the upper plate 341 and the middle plate 342 and a second inducing wing 346 formed perpendicularly between the middle plate 342 and the lower plate 343. In the embodiment, three sets 361,362,363 of the wing members 326a formed with the dividing plate 344 and the distributing wing 347 are integrally assembled with the columnar member 326b (the remaining one 349 will be explained later). That is, the swing-wing 326 is formed so that the three wing members 326a each having a dividing plate 344 and a distributing wing 347 are integrally attached to the columnar member 326b. The upper end of the swing-wing 326 is connected to an output shaft (FIG. 6) of the driving motor 28 to operate the swing-wing 326. It is more desirable that the columnar member 326b is shaped with a crisscross in cross-section.

Numeral 349, in FIGS. 15A and 15B, is a phantom (dummy) wing set which is irrelevant to the discharge of the cool air. Since no opening is provided at the corresponding position to the phantom (dummy) wing 349, it is directly unrelated to the discharging flow of the air. However, through the gap G (FIG. 7) between the rear surface of the grill 27 and the circumference of the swing-wing 26, the cool air is fed into the space housing of the phantom (dummy) wing 349. The air in the space is stirred by the phantom (dummy) wing 349 to increase the distribution effect with respect to the air flowing down to the lower wing member 363. Further, the balancing arrangement of the wing member provides external harmony.

Figure 15C:
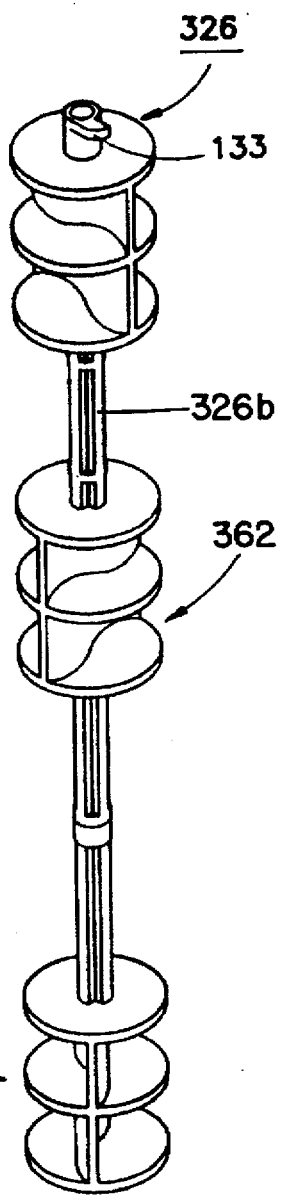

The swing-wing 326 is detachably formed as shown in FIG. 15B to solve the problem rising from the manufacturing process. The upper portion of the swing-wing 326 consists of the upper wing member 361 and the middle wing member 362, and the lower portions of the swing-wing 326 consists of the lower wing member 363. In the case that the respective distributing wings 347 are molded in a different direction from each other (as will be explained in more detail later), there occurs the difficulty that a single cavity molding form can not be used. Therefore, the swing-wing 326 is divided into two portions. In the upper portions 361,362 of the swing-wing 326 the edges 347E,347E' of the distributing wings 345,346 are rotationally offset by 90° to each other. In the lower portion 349,363 of the swing-wing 326 the edges 347E",347E"' of the distributing wing 345,346 are form a zero degree angle with each other. Thus, if the assembling degree between the upper portions 361,362 and the lower portions 349,363 can be changed, the layout of the whole distributing wings 345,346 can be varied. In the embodiment, the edges 347E",347E"' offset by 45° relative to the edge 347E and the edge 347E'. FIG. 15C shows a modified example of the third embodiment, which illustrates the swing-wing 326 without the phantom (dummy) wing set 349.

Similar to the above-described embodiments, the upper, the middle and the lower distributing wings 361,362,363 are rotationally offset. Therefore, the impinging point of air against the wing 347 and the discharging direction from the distributing wing 347 differs from wing to wing, thereby causing the load applied to the distributing wing 347 to diminish. If, instead, the edges 347E,347E', 347E",347E''' of the inducing wings 345,346 were aligned, the cool air would be deflected off the vanes in the same direction, to produce excessive load on the swing-wing. In the embodiment, the rotationally offset relationship of the distributing wing sets results in a more balanced loading.

The edges 347E, 347E', 347E''' are all disposed within a range of 90°.

By using the offset angular disposition of the edges, the cooled air discharged through the openings flows within a range of about 90° toward the specified area of the refrigerating compartment as shown in FIGS. 10A, 10B, 10C, respectively. The direction of the concentrated cooled air flow is controlled by the protuberance 133 provided at the upper end of the columnar member 126b as in the operation of FIGS. 11A, 11B, 11C.

In this embodiment, a single swing-wing 326 is employed, since the configuration of the swing-wing 326 is matched to the nature of the air flow through the openings of the air distribution apparatus 17.

Figure 16:
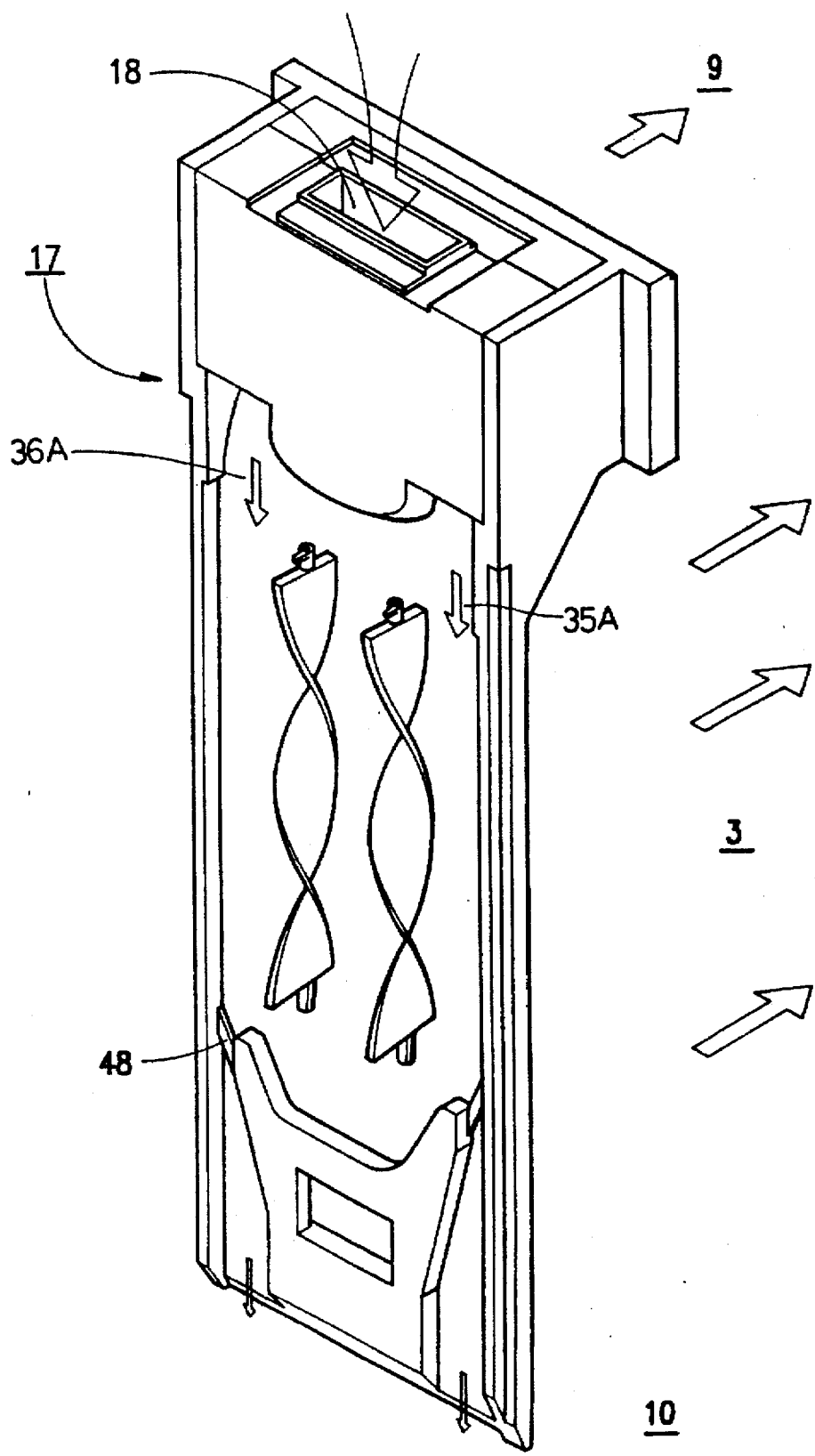
FIG. 16 is a rear perspective view of the cool air distribution apparatus without an air guiding means.

FIGS. 16 to 21 illustrate various embodiments of a cool air distribution apparatus, without an air guiding means, adapted to the previous embodiments. FIG. 16 shows the rear perspective view of another air distribution apparatus without the air passage 15, the openings 16 and the related components. Except for that every component of FIG. 16 is identical to that of FIG. 8. The same component parts as those in 16 are designated by the same reference numerals as in FIG. 8, but the detailed description of the parts will be omitted.

Figure 17:
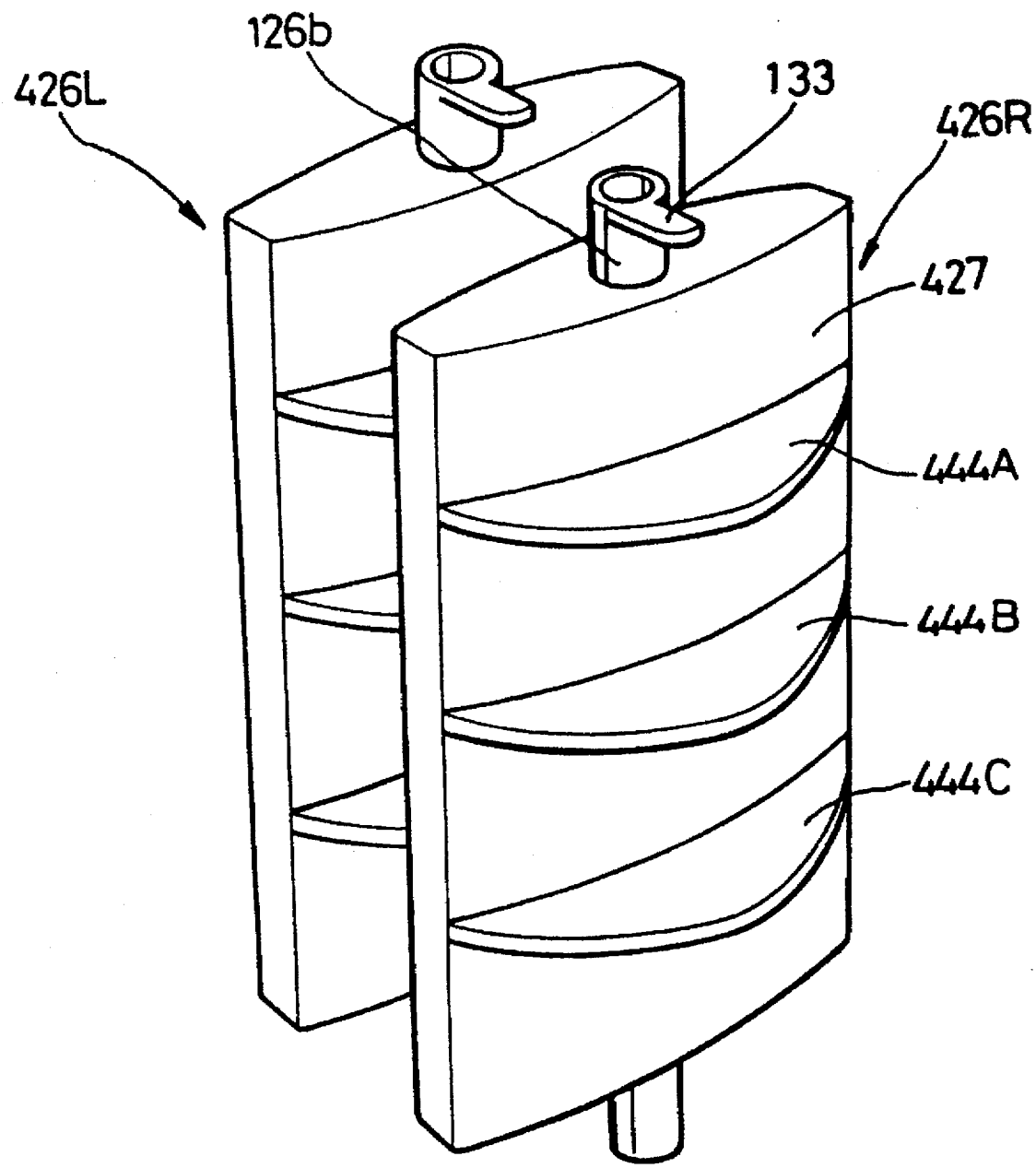
FIG. 17 is a perspective view of a fourth embodiment example of an air distributing means.

FIG. 17 shows a fourth embodiment of the swing-wing 426R,426L. Each swing-wing 426R,426L comprises a wing member 427 and a columnar member 126b. The wing member 427 is formed as a plate extending in a vertical direction, and has a plurality of horizontal dividing members or wings 444A, 444B and 444C which are equally vertically spaced from each other and are formed perpendicularly on one vertical side surface of the wing member 427. In this example, although dividing members are provided on only one vertical side surface of the wing member 427, both vertical side surfaces could carry dividing members. The position of respective dividing members 444A,444B,444C correspond to the respective lower edges of a plurality of meshed openings (not shown) of the grill 27. Further, respective openings of the grill 27 match up with the partitioned space between the shelves 8 of the refrigerating compartment 3. Therefore, the air flow down through the ducts 35A,36A is guided into respective partitioned spaces of the refrigerating compartment 3.

With reference to FIG. 16, the cool air generated from the evaporator 12 is mostly discharged into the refrigerating compartment 3 and the vegetable compartment 10 after flowing along the first duct 35A and the second duct 36A. Thus, the air guided through the first duct 35A at the right side is directed by impinging on respective dividing members 444A,444B,444C, while the air guided through the second duct 36A at the left side is directed by impinging on respective dividing members 444A,444B,444C. Further, the horizontal plate-like dividing members 444A,444B,444C shown in FIG. 17 keep the impinged air turning in approximately a 90 degree direction into the refrigerating compartment.

When concentrated cooling is required for a specified area of the refrigerating compartment, the concentrated cooling as shown in FIGS. 10A, 10B, 10C is achieved by using the protuberance 133 provided at the upper end of the columnar member 126b.

Figure 18:
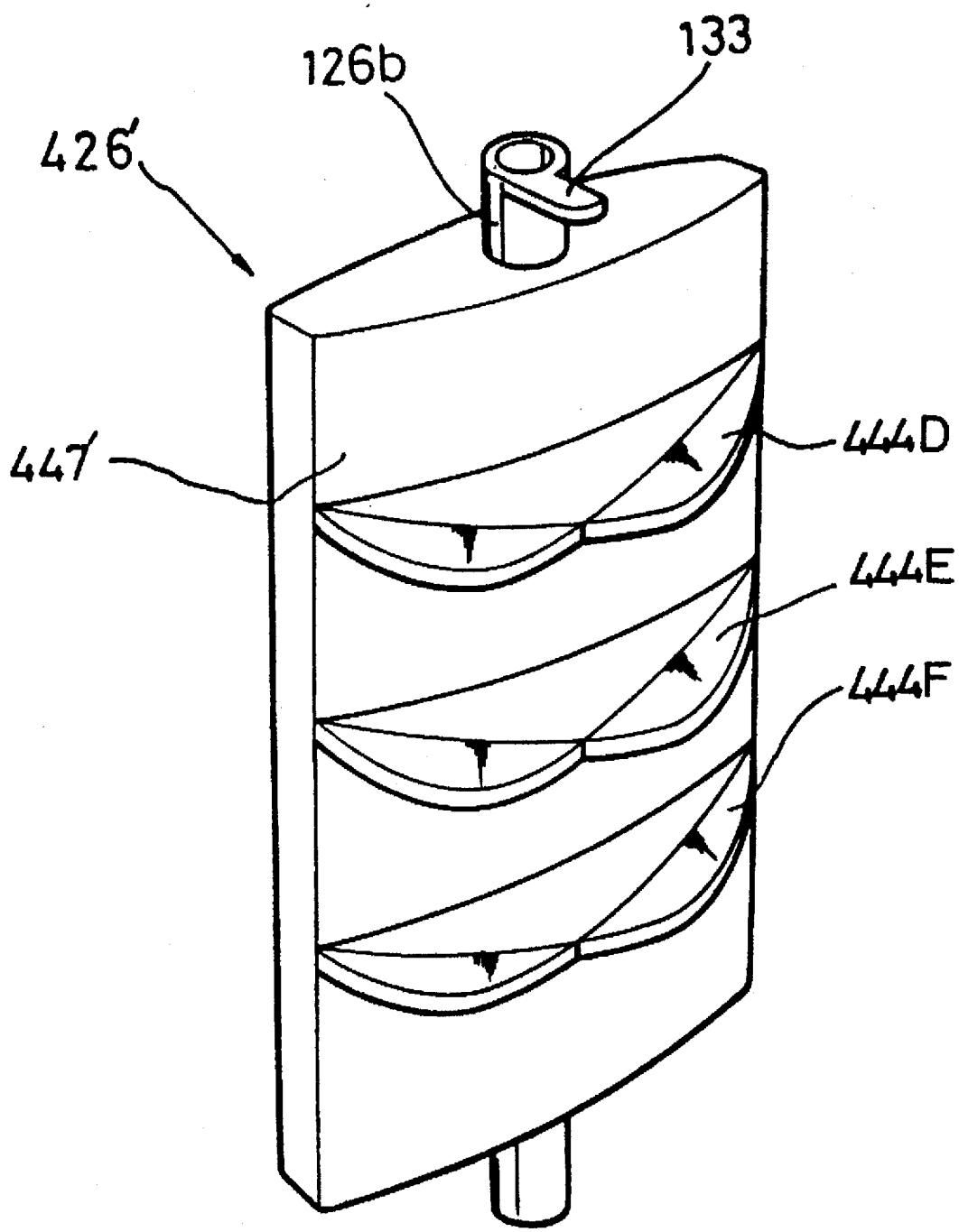
FIG. 18 is a perspective view showing a modified example of the air distributing means of FIG. 17.

FIG. 18 shows a modified example of the fourth embodiment. The swing-wing has the same components as the fourth embodiment in FIG. 17. The swing-wing 426' comprises a columnar member 126b extended vertically, and a wing member 4471 which is disposed on the columnar member 126b. It is more desirable that a couple of swing-wings 426' are installed at the first duct 35A and second duct 36A respectively. A plurality of distributing wings 444D, 444E,444F are provided which slant downwardly and outward.

Figure 19:
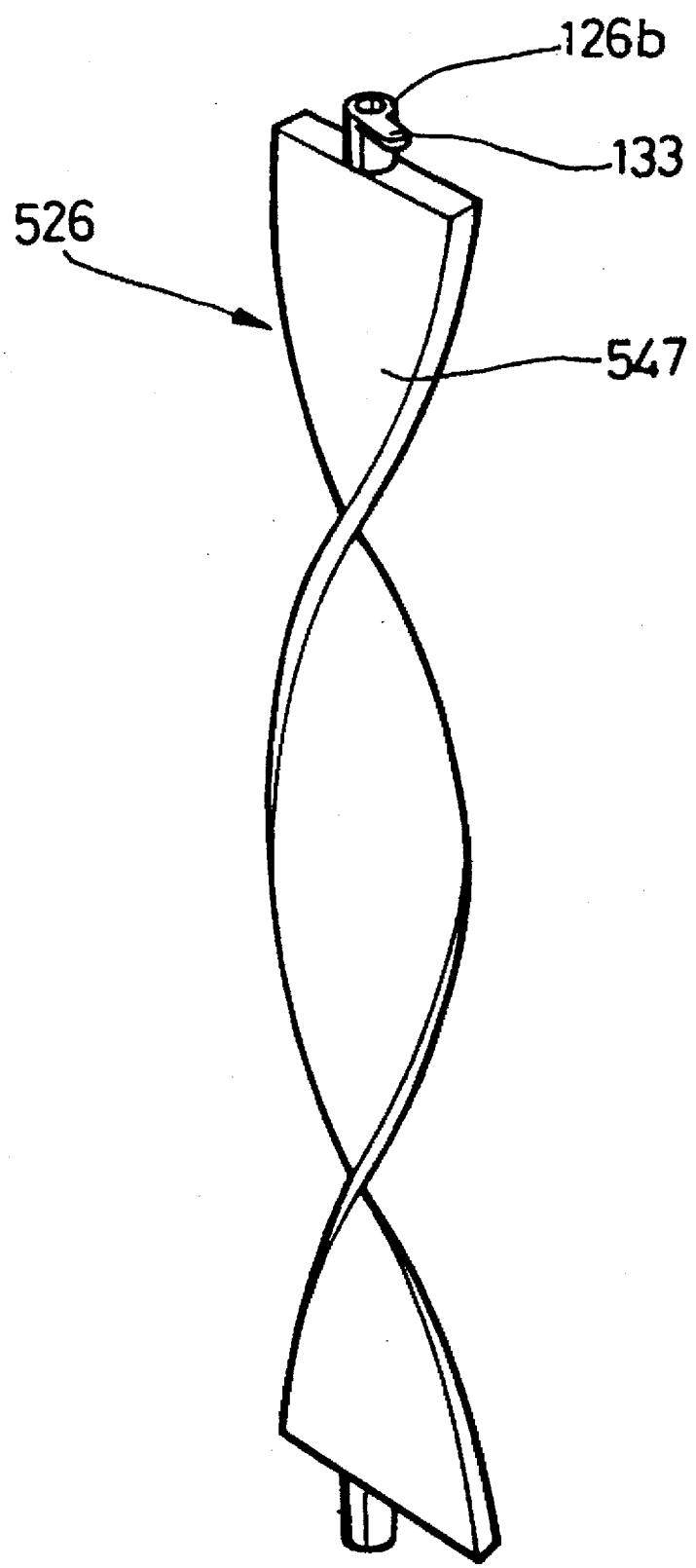
FIG. 19 is a perspective view of a fifth example of an air distributing means.

FIG. 19 illustrate a fifth embodiment of the swing-wing 526. The swing-wing 526 comprises a wing member 547 and a columnar member 126b. The wing member 547 is formed as a helix shaped plate extending in a vertical manner. Further, the wing member 547 is integrally assembled with the columnar member 126b. Furthermore, the protuberance 133 is provided at the upper end of the swing-wing 526 for controlling the rotation position of the swing-wing 526 when the localized flow in the refrigerating compartment 3 is required. It is more desirable that a couple of swing-wings 526 are installed at the first duct 35A and second duct 36A, respectively. The helix angle of the wing member 547 is more slanted at the inlet or upper portion than at the outlet or lower portion, because the volume of air impinging against the lower portion of the wing member 547 is larger than that on the upper portion thereof. This satisfies the phenomenon that the lower the air goes, the higher the air temperature becomes.

The cool air generated from the evaporator 12, as shown in FIG. 16, is mostly discharged into the refrigerating 3 and the vegetable compartment 10 after flowing along the first duct 35A and the second duct 36A. Thus, the air guided through the first and second ducts 35A,36A at the right or the left side impinges against the upper portion of the wing member 547. A first volume of the impinged air is discharged into the partitioned space between the shelves 8 of the refrigerating compartment 3 through the corresponding upper opening of the grill 27. Through the middle opening of the grill a greater volume of the air flows into the corresponding space. In the lowest opening of grill, a greatest volume of the air is discharged into the space of the refrigerator 3.

When concentrated cooling is required for a specified area of the refrigerating compartment, the concentrated cooling as shown in FIGS. 10A, 10B, 10C is achieved by using the protuberance 133 provided at the upper end of the columnar member 126b.

Figure 20:
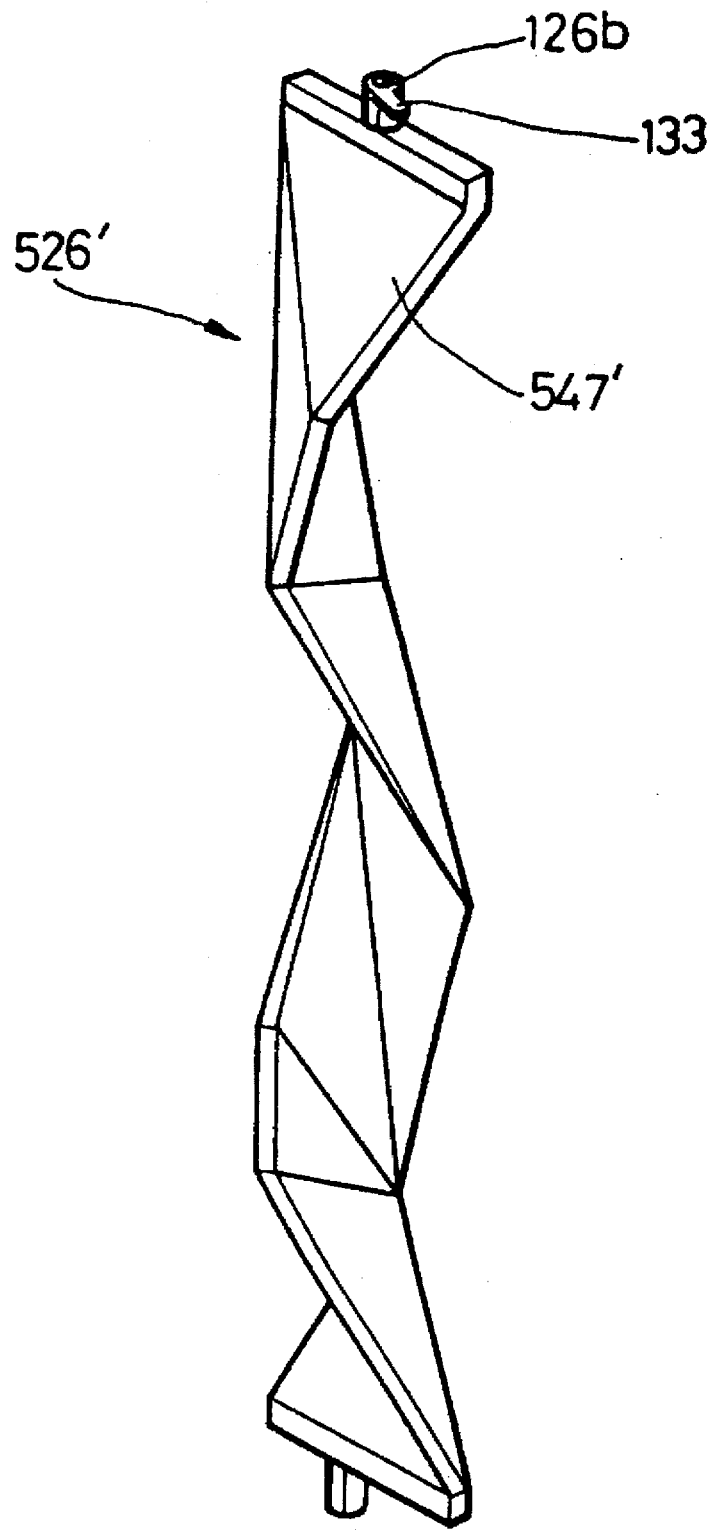
FIG. 20 is a perspective view showing a modified example of the air distributing means of FIG. 19.

FIG. 20 shows a modified example of the fifth embodiment. The swing-wing has the same components as the fifth embodiment in FIG. 19. The swing-wing 526' comprises a columnar member 126b extended vertically, and a wing member 547' which is disposed at the columnar member 126b and is formed by successive planar segments arranged in a generally helix shape.

Figure 21:
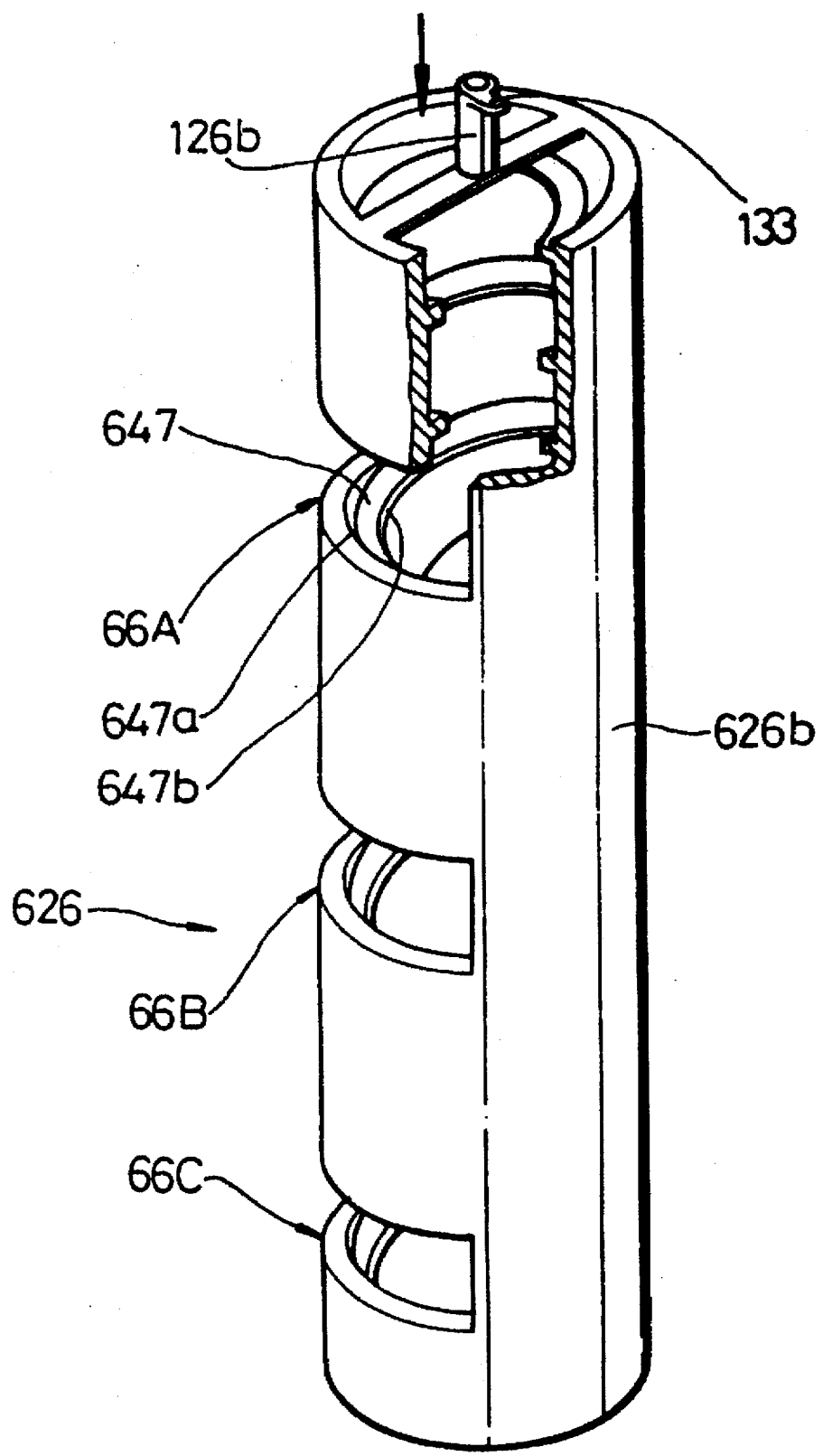
FIG. 21 is a perspective view of a sixth example of an air distributing means.

FIG. 21 illustrates a sixth embodiment of the swing-wing 626. The swing-wing 626 comprises a hollow cylindrical member 626b and a columnar member 126b protruded upward or downward from both upper and lower ends of the cylindrical member 626b, and around which the cylindrical member 626b is rotated. The protuberance 133 is provided at the upper end of the upper columnar member 126b for controlling the rotation position of the swing-wing 626 when the localized flow in the refrigerating compartment 3 is required. It is more desirable that a couple of swing-wings 626 are installed at the first duct 35A and second duct 36A, respectively. Further, a helix wing member 647 is formed on the interior wall of the cylindrical member 626b. One side edge 647a of the helix member 647 extends along the interior wall of the cylindrical member 626b. Another side edge 647b of the helix member 647 slants is offset radially inwardly from the wall toward the center of the cylindrical member 626b. On the wall of the cylindrical member 626b, there are a plurality of vertically spaced openings 66A,66B, 66C. The position of respective openings 66A,66B,66C corresponds to the partitioned space between the shelves 8 of the refrigerating compartment 3. At the same traverse point of the slant of the helix member 647, the one side end edge 647a of the helix member 647 is horizontally formed, while the other side end edge 647b thereof is slanted upwardly. The slant upward angle of the inner edge 647b relative to the outer edge 647a is lowest at the upper opening 66A, while highest at the lower opening 66C. Thus, the slant upward angle is in the middle at the middle opening 66B. Due to the configuration of the slant, less air is discharged through the upper opening 66A, and more air is discharged through the lower opening 66C.

The cool air generated from the evaporator 12 is mostly discharged into the refrigerating compartment 3 and the vegetable compartment 10 after flowing along the first duct 35A and the second duct 36A. Thus, the air guided through the first and second ducts 35A,36A at the right or the left side flows into the top of the cylindrical member 626b and contacts the helix member 647 adjacent to the upper opening 66A. Part of the impinged air is discharged into the partitioned space between the shelves 8 of the refrigerating compartment 3 through the corresponding upper opening 66A of the grill 27. Through the middle opening 66B a greater volume of the air than that of the upper one flows into the corresponding space. In the lowest opening 66C, a greater volume of the air than that of the middle opening 66B is discharged into the space of the refrigerator 3.

When concentrated cooling is required for a specified area of the refrigerating compartment, the concentrated cooling as shown in FIGS. 10A, 10B, 10C is achieved by using the protuberance 133 provided at the upper end of the columnar member 126b.

As described in detail above, the uniform refrigeration can be accomplished more effectively by means of various embodiments of the swing-wings which disperse the discharged cool air.

In the case that there is any temperature deviation in the compartment, the area with a relatively high temperature can receive concentrating cooling for some period until the uniform temperature is reached. Accordingly, this invention possesses the advantage of achieving the concentrating cooling in any case.

What is claimed is:

1. A refrigerator, comprising:
   a body forming a refrigerating compartment;
   an air distribution structure disposed on a wall of said compartment and including a cool air inlet for receiving a flow of cool air, and a dividing structure disposed downstream of the cool air inlet for dividing the cool air flow into a plurality of separate vertically spaced cool air streams; and
   an adjustable air directing structure situated downstream of the dividing structure for controlling the horizontal direction of flow of each of the cool air streams into the compartment, the air directing structure comprising a plurality of vanes situated in respective air streams and rotatable about a vertical axis.

2. The refrigerator according to claim 1, wherein each vane includes a vertical center, the vertical centers being aligned with one another, the vertical axis being horizontally offset with respect to the vertical centers.

3. The refrigerator according to claim 2, wherein each vane has an oval-shaped cross section taken in a direction perpendicular to the vertical axis.

4. The refrigerator according to claim 1, wherein the air directing structure comprises a vertical rotary shaft and a plurality of vertically spaced vanes mounted on the vertical shaft.

5. The refrigerator according to claim 4, wherein there are a plurality of vertically spaced horizontal plates on the shaft, and the vanes extending perpendicularly from respective plates.

6. The refrigerator according to claim 5, wherein a plurality of circumferentially spaced vertical grooves are formed in an outer periphery of each plate.

7. The refrigerator according to claim 5, wherein each vane includes concave and convex portions arranged in sequence to form a wave-shaped vane.

8. The refrigerator according to claim 4 further including vertically spaced pairs of horizontal plates on the shaft, each vane extending vertically between respective pairs of plates.

9. The refrigerator according to claim 8, wherein each vane includes concave and convex portions arranged in sequence to form a wave-shaped vane.

10. The refrigerator according to claim 9, wherein the concave and convex portions of one vane are situated directly above the convex and concave portions, respectively, of another vane.

11. A refrigerator comprising:
    a body forming a refrigerating compartment;
    an air distribution structure disposed on a wall of the compartment and forming a cool air inlet, and vertically spaced cool air outlets communicating with the compartment; and
    an adjustable air directing structure disposed between the cool air inlet and the cool air outlet for controlling the horizontal direction of cool air into the compartment the air directing structure comprising vertical vanes rotatable about a vertical axis.

12. The refrigerator according to claim 11, wherein each vertical vane includes a plurality of wings projecting from opposite vertical sides of the vane.

13. The refrigerator according to claim 12, wherein the wings project perpendicularly from the vertical sides.

14. The refrigerator according to claim 12, wherein the wings extend non-perpendicularly from the vertical sides.

15. The refrigerator according to claim 11, wherein the air directing structure comprises a vertical rotary shaft and a helix shaped wing member joined to the shaft and having its longitudinal axis aligned with the shaft.

16. The refrigerator according to claim 15, wherein the helix shaped wing member incudes smooth helical surfaces.

17. The refrigerator according to claim 15, wherein the helix shaped wing member includes helical surfaces formed of successively arranged planar segments.

18. The refrigerator according to claim 11, wherein the air directing structure comprises a hollow cylinder into which cool air axially enters, vertically spaced air outlets formed in the cylinder, and a helical wing formed on an inside surface of the cylinder.

19. The refrigerator according to claim 18, wherein the helical wing extends perpendicularly from the inside surface.

\* \* \* \* \*